(12) United States Patent
Lee et al.

(10) Patent No.: US 11,446,811 B2
(45) Date of Patent: Sep. 20, 2022

(54) ROBOT

(71) Applicant: LG ELECTRONICS INC., Seoul (KR)

(72) Inventors: Iljae Lee, Seoul (KR); Hoseong Kang, Seoul (KR); Sunil Cho, Seoul (KR); Jaeyoung Kim, Seoul (KR); Sunghee Han, Seoul (KR); Seungjong Park, Seoul (KR); Jaemyoung Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 96 days.

(21) Appl. No.: 16/841,263

(22) Filed: Apr. 6, 2020

(65) Prior Publication Data

US 2021/0162581 A1    Jun. 3, 2021

(30) Foreign Application Priority Data

Dec. 2, 2019 (KR) .......................... 10-2019-0158130

(51) Int. Cl.
| | |
|---|---|
| B25J 5/00 | (2006.01) |
| B25J 9/00 | (2006.01) |
| B25J 9/16 | (2006.01) |
| B25J 11/00 | (2006.01) |

(52) U.S. Cl.
CPC ............. *B25J 9/0009* (2013.01); *B25J 5/007* (2013.01); *B25J 9/161* (2013.01); *B25J 11/008* (2013.01)

(58) Field of Classification Search
CPC ........ B25J 11/008; B25J 9/0009; B25J 5/007; A47B 88/443; A47B 88/40; A47B 88/49
See application file for complete search history.

(56) References Cited

U.S. PATENT DOCUMENTS

| | | | | |
|---|---|---|---|---|
| 9,283,990 | B1 * | 3/2016 | Yaeger | B62D 21/00 |
| 9,535,421 | B1 * | 1/2017 | Canoso | G05D 1/0248 |
| 11,154,134 | B2 * | 10/2021 | Albrecht | A47B 88/45 |
| 2007/0192910 | A1 * | 8/2007 | Vu | B25J 19/06 |
| | | | | 700/245 |
| 2012/0308297 | A1 * | 12/2012 | Chen | A47B 88/49 |
| | | | | 403/109.2 |

* cited by examiner

*Primary Examiner* — Randell J Krug
(74) *Attorney, Agent, or Firm* — Birch, Stewart, Kolasch & Birch, LLP

(57) ABSTRACT

A robot includes a mobile robot provided with driving wheels, a frame provided in the mobile robot, a housing having an opening formed therein, a drawer guide having a fixed bracket installed in the housing and a moving bracket moving along the fixed bracket and drawable out through the opening, and a drawer mounted on the moving bracket to be inserted into the housing or drawn out of the housing.

11 Claims, 21 Drawing Sheets

ROBOT

CROSS-REFERENCE TO RELATED APPLICATIONS

This application claims the benefit of priority to Korean Patent Application No. 10-2019-0158130, filed in the Korean Intellectual Property Office on Dec. 2, 2019, the entire contents of which are incorporated herein by reference.

FIELD OF THE DISCLOSURE

The present disclosure relates to a robot capable of transporting items such as medicine and medical supplies.

Robots have been developed for industrial use, for factory automation. Recently, since applications of robots have been further expanded, not only medical robots and aerospace robots but also robots available in daily life have been developed.

Such robots available in daily life provide specific services (e.g., shopping, serving, conversation, cleaning, etc.) in response to user's commands.

However, since existing robots available in daily life were designed to provide only specific services, the utilization of the robots is not high as compared to the cost invested to develop the robots.

Therefore, there is a need for a robot capable of providing various services.

SUMMARY

Embodiments provide a robot capable of minimizing the possibility of overturning by lowering the center of gravity.

Embodiments also provide a robot capable of increasing utilization of a peripheral space of the robot.

In an embodiment, a robot according to an embodiment of the present disclosure may include a mobile robot provided with driving wheels and a frame provided in the mobile robot.

The robot may include a housing having an opening formed therein, a drawer guide having a fixed bracket installed in the housing and a moving bracket moving along the fixed bracket and drawable out through the opening, and a drawer mounted on the moving bracket to be inserted into the housing or drawn out of the housing.

The opening may be formed in the rear surface of the housing, and the drawer may be drawn to the rear side of the housing.

A plurality of drawer guides and drawers may be provided.

A distance between a first drawer and the frame may be less than a distance between a second drawer located below the first drawer and the frame.

A horizontal length of an upper end of the housing may be less than that of a lower end of the housing.

The housing, the drawers and the drawer guides may configure a service module. When the plurality of drawers is maximally inserted into the housing, the service module may gradually become thin upward.

The plurality of drawer guides may include a first drawer guide guiding the first drawer, and a second drawer guide guiding the second drawer and located below the first drawer guide.

The housing may include an outer housing and an inner housing disposed in the outer housing.

In the inner housing, a first mounting hole, in which a fixed bracket of the first drawer guide is mounted, and a second mounting hole, in which a fixed bracket of the second drawer guide is mounted, may be formed.

A distance between the first mounting hole and the frame may be less than a distance between the second mounting hole and the frame.

A service module may include a locker disposed in the housing to lock or unlock the drawers.

The housing includes a front body surrounding a rear surface and a side surface of the frame, and the front body may include a left plate and a right plate spaced apart from each other in a left-and-right direction, and a rear plate connecting the left plate with the right plate.

The locker may be mounted on the rear plate.

The frame may include a front neck and a front cover covering the front neck.

A front opening, through which a releaser for unlocking the locker penetrates, may be formed in the front neck.

The frame may further include a printed circuit board (PCB) disposed on a front surface of the front neck and covered by the front cover.

The locker may include a connecting terminal connected with a cable connected to the PCB.

A through-hole, through which the cable or the connecting terminal penetrates, may be formed in the front neck.

A plurality of lockers may be provided.

The plurality of lockers may include a first locker having a locking pin for locking the first drawer, and a second locker located below the first locker and having a locking pin for locking the second drawer.

Each of the plurality of lockers may include a releaser for unlocking the locking pin.

The locking pin of the first locker and the locking pin of the second locker may protrude in opposite directions in an upper-and-lower direction.

The robot may further include a display and a display rotor installed in the frame to rotate the display.

The display rotor may rotate the display in a plurality of modes.

The plurality of modes may include a first mode in which a screen of the display faces a front upper side, and a second mode in which the screen of the display faces a rear upper side.

The display may display different information in the first mode and the second mode.

A pocket having the drawer guide accommodated therein and protruding toward an inside of the drawer may be formed on a bottom of the drawer, and the pocket may include a left plate, a right plate and an upper plate.

The details of one or more implementations are set forth in the accompanying drawings and the description below. Other features will be apparent from the description and drawings, and from the claims.

DETAILED DESCRIPTION OF THE EMBODIMENTS

Figure 1:
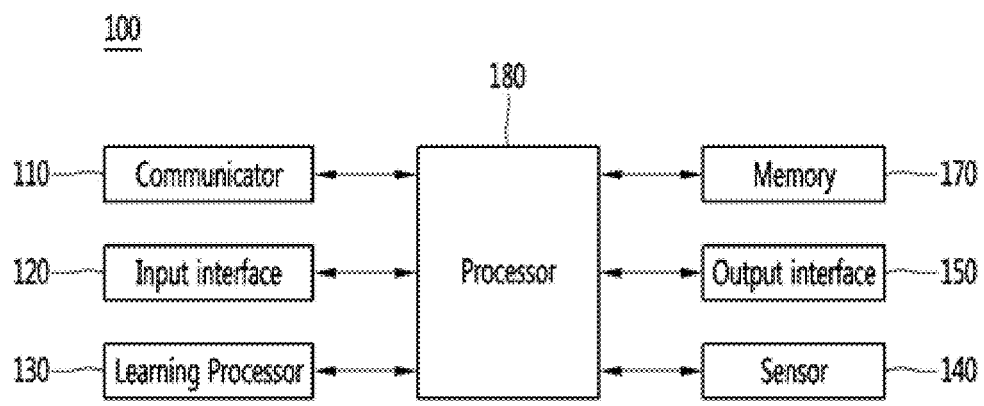
FIG. 1 is a view illustrating an AI device constituting a robot system according to an embodiment.

Hereinafter, detailed embodiments will be described in detail with reference to the accompanying drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues.

Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communicator 110, an input interface 120, a learning processor 130, a sensor 140, an output interface 150, a memory 170, and a processor 180.

The communicator 110 may transmit and receive data to and from external devices such as other AI devices 100a to 100e and the AI server 500 by using wire/wireless communication technology. For example, the communicator 110 may transmit and receive sensor information, a user input, a learning model, and a control signal to and from external devices.

The communication technology used by the communicator 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 540 of the AI server 500.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display unit for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 540 of the AI server 500, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 500. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
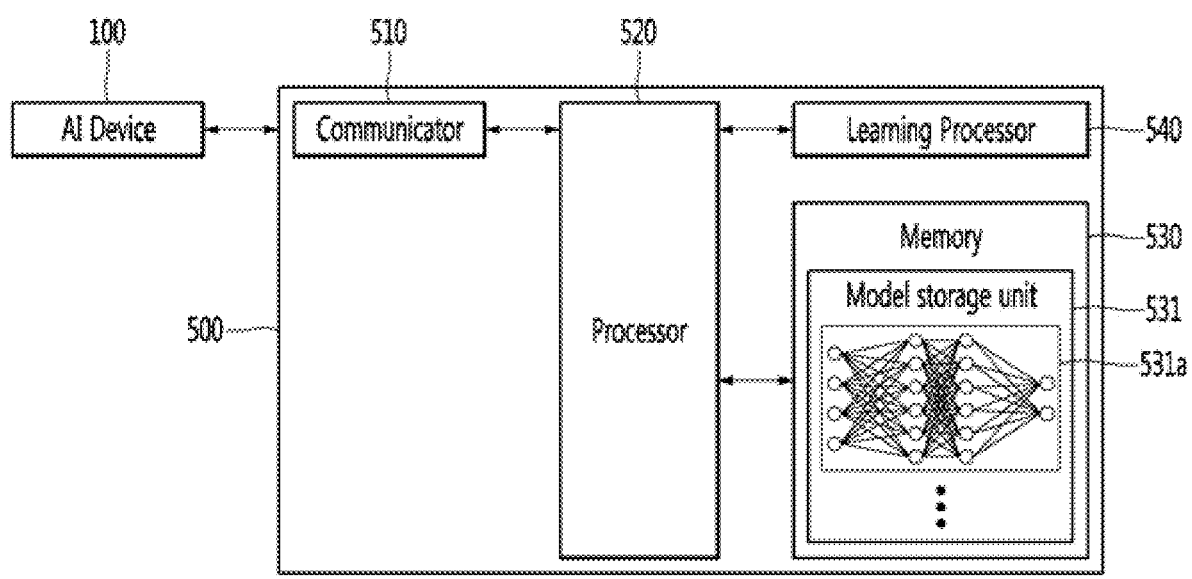
FIG. 2 is a view illustrating an AI server of a robot system according to an embodiment.

FIG. 2 illustrates an AI server 500 connected to a robot according to an embodiment of the present disclosure.

Referring to FIG. 2, the AI server 500 may refer to a device that learns an artificial neural network by using a machine learning algorithm or uses a learned artificial neural network. The AI server 500 may include a plurality of servers to perform distributed processing, or may be defined as a 5G network. At this time, the AI server 500 may be included as a partial configuration of the AI device 100, and may perform at least part of the AI processing together.

The AI server 500 may include a communicator 510, a memory 530, a learning processor 540, a processor 520, and the like.

The communicator 510 can transmit and receive data to and from an external device such as the AI device 100.

The memory 530 may include a model storage unit 531. The model storage unit 531 may store a learning or learned model or an artificial neural network 531a through the learning processor 540.

The learning processor 540 may learn the artificial neural network 531a by using the learning data. The learning model may be used in a state of being mounted on the AI server 500 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 530.

The processor 520 may infer the result value for new input data by using the learning model and may generate a response or a control command based on the inferred result value.

Figure 3:
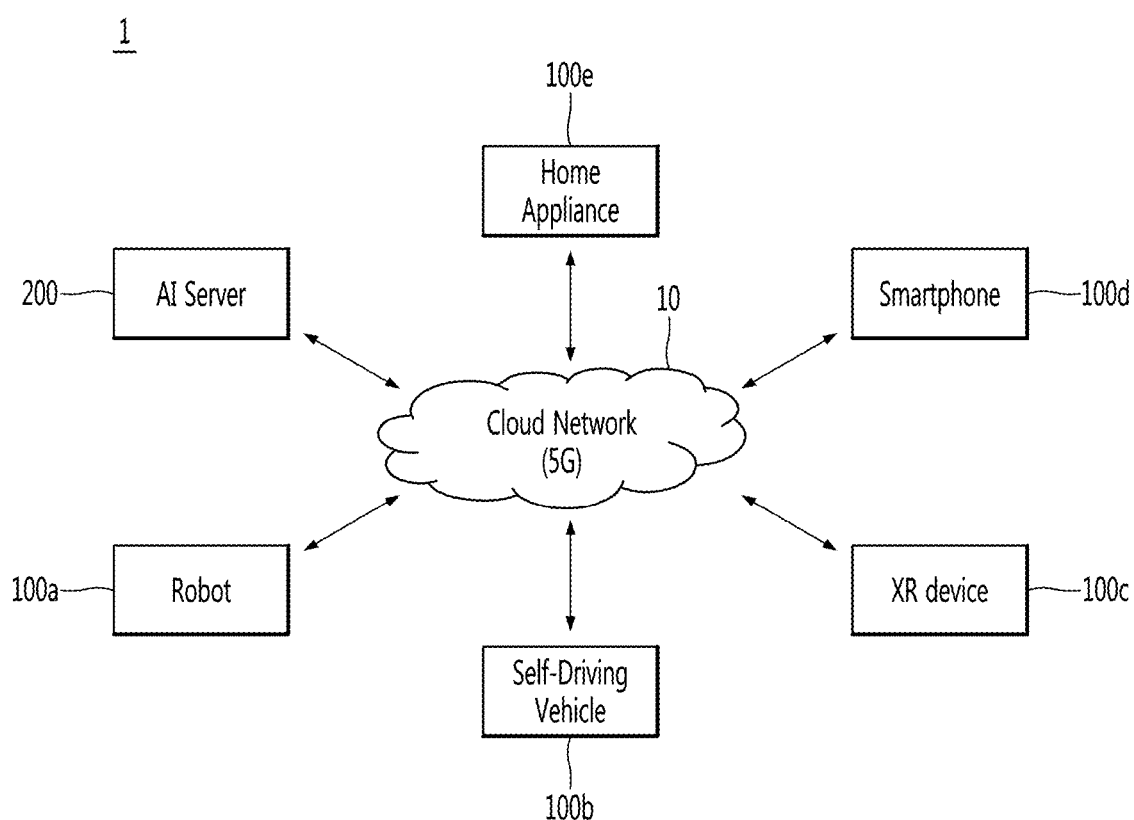
FIG. 3 is a view illustrating an AI system to which a robot system according to an embodiment is applied.

FIG. 3 illustrates an AI system 1 according to an embodiment of the present disclosure.

Referring to FIG. 3, in the AI system 1, at least one of an AI server 500, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 500 configuring the AI system 1 may be connected to each other through the cloud network 10. In particular, each of the devices 100a to 100e and 500 may communicate with each other through a base station, but may directly communicate with each other without using a base station.

The AI server 500 may include a server that performs AI processing and a server that performs operations on big data.

The AI server 500 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 500 may learn the artificial neural network according to the machine learning algorithm instead of the AI devices 100a to 100e, and may directly store the learning model or transmit the learning model to the AI devices 100a to 100e.

At this time, the AI server 500 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 500.

At this time, the robot 100a may perform the operation by generating the result by directly using the learning model, but the sensor information may be transmitted to the external device such as the AI server 500 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as chairs and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or the user's speech utterance, and may determine the response based on the acquired intention information, and may perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for (e.g., by) itself along the given movement line without the user's control or moves for (e.g., by) itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through at least one of the lidar, the radar, and the camera of the robot 100a or the self-driving vehicle 100b.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

Hereinafter, a delivery robot capable of transporting various items such as medicine and medical supplies in a state of being contained in a drawer will be described.

Figure 4:
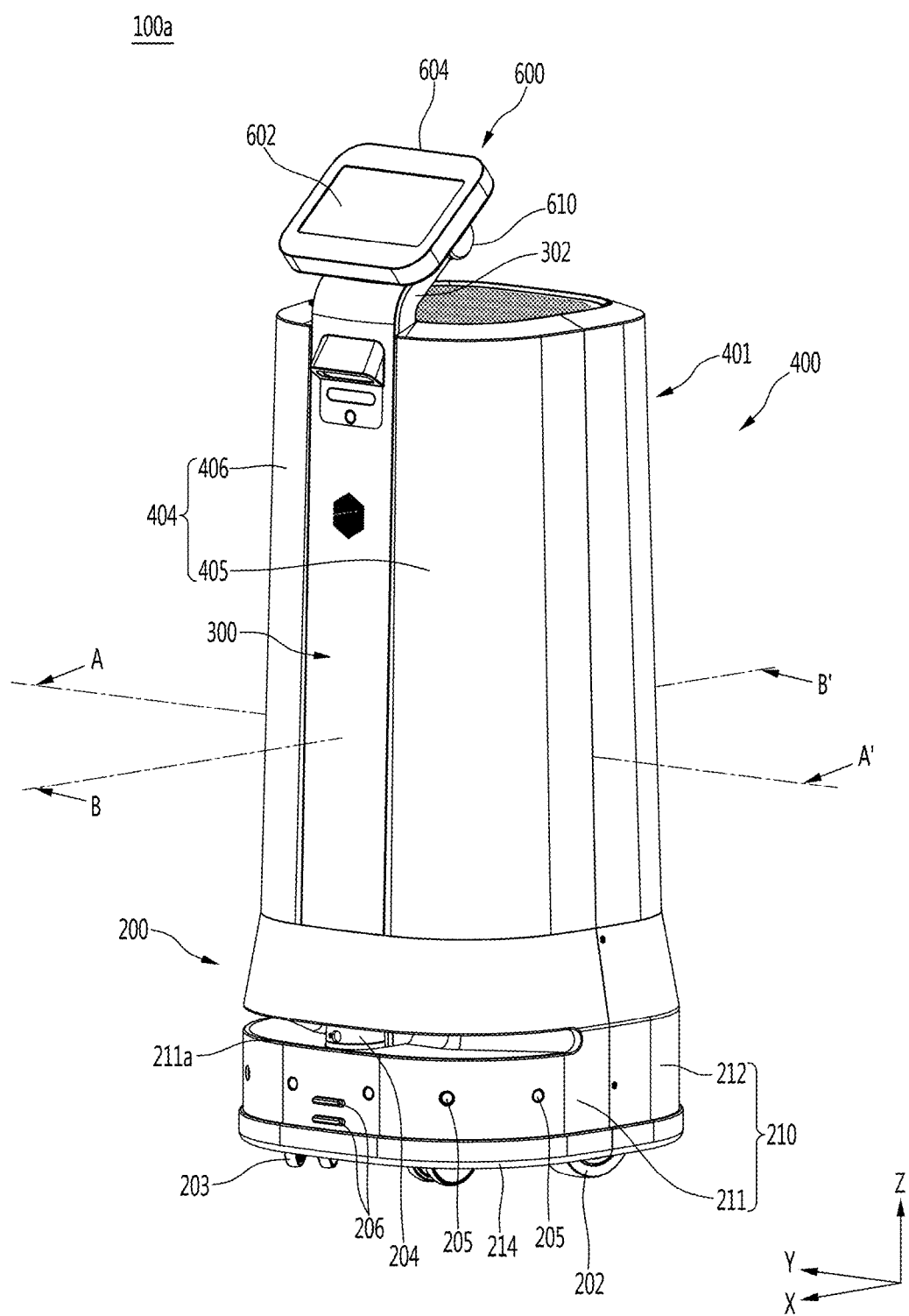
FIG. 4 is a perspective view of a robot according to an embodiment.
Figure 5:
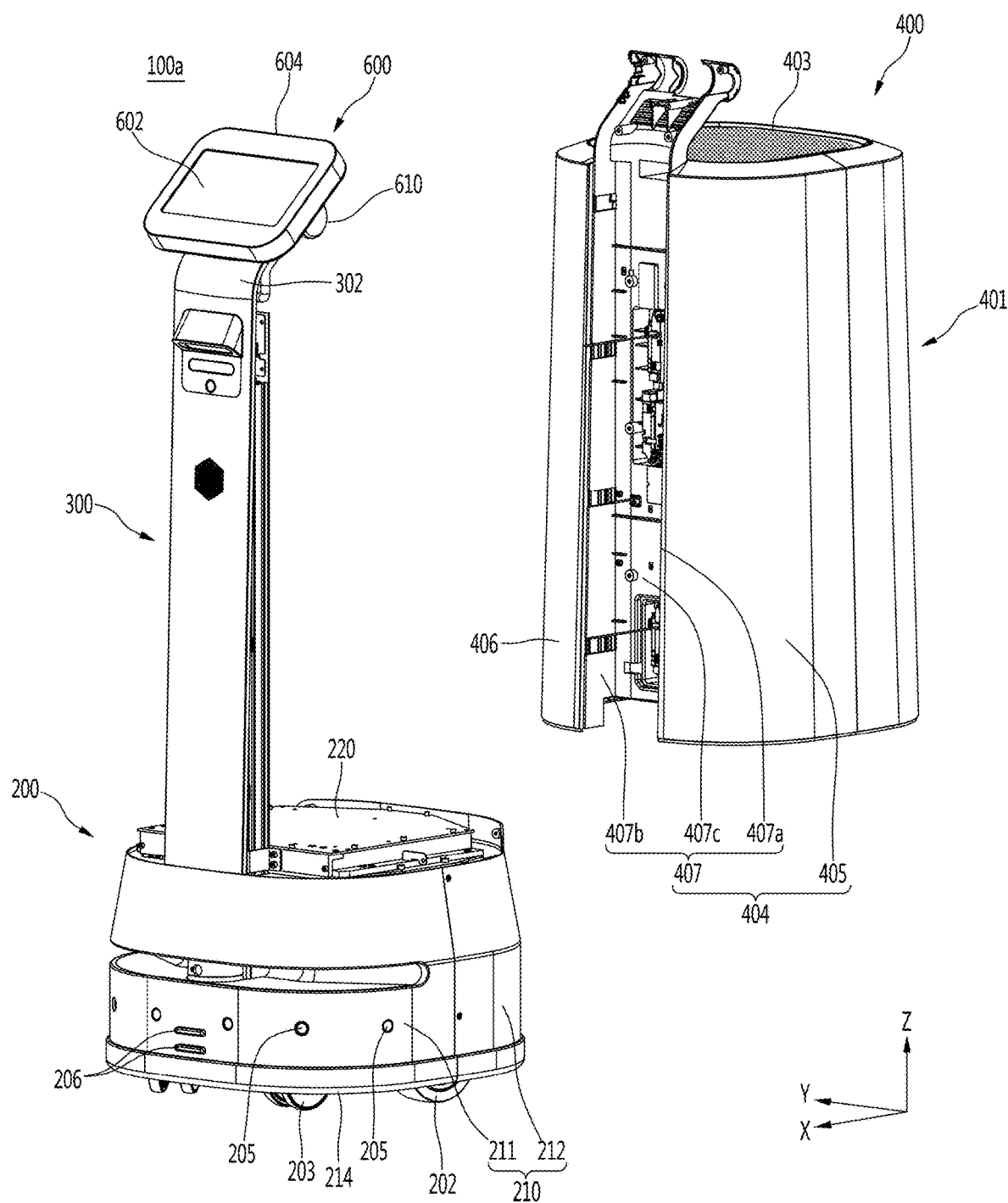
FIG. 5 is a perspective view of the robot when the service module shown in FIG. 4 is detached from a mobile robot.
Figure 6:
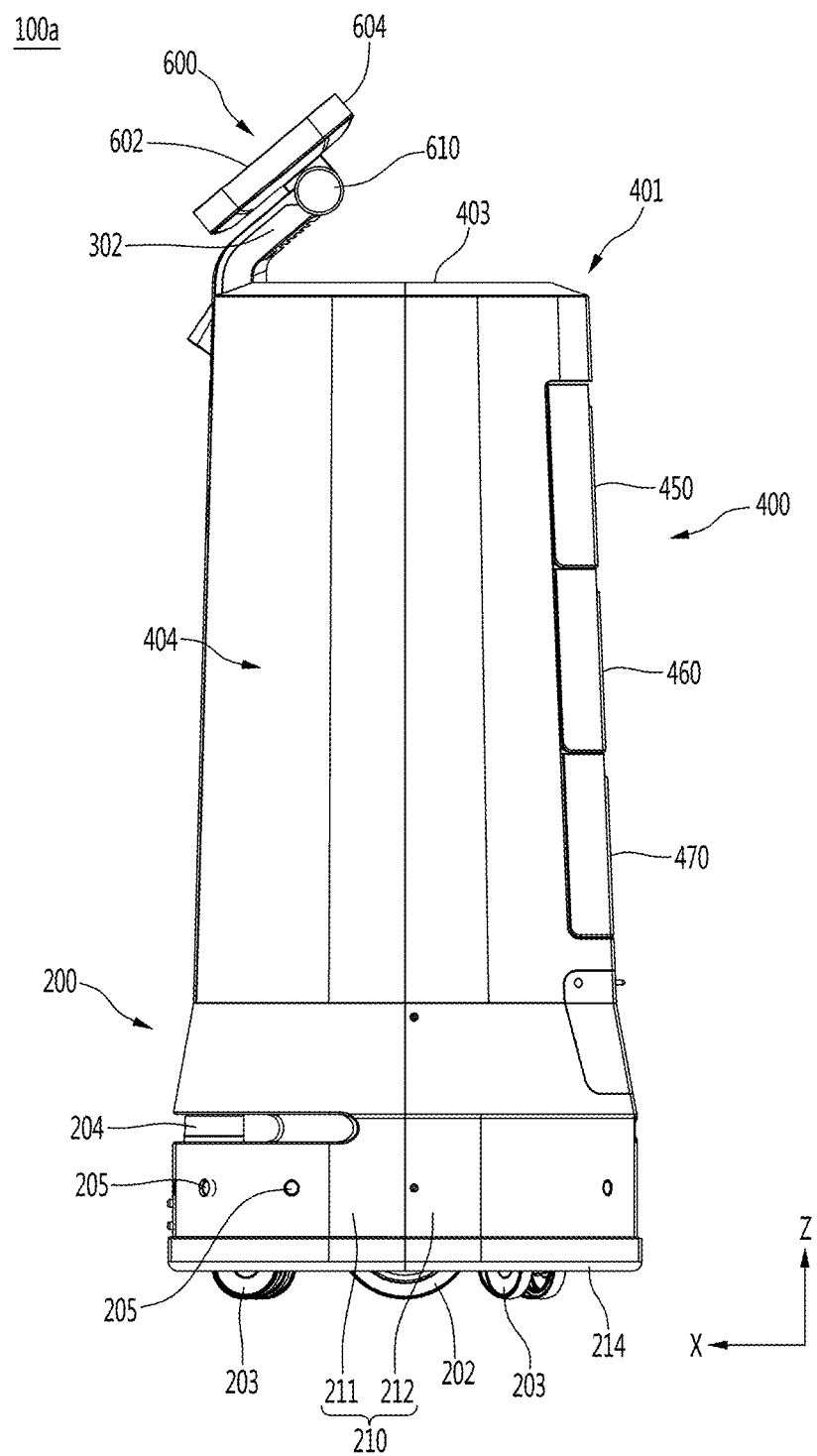
FIG. 6 is a side view of a robot according to an embodiment.
Figure 7:
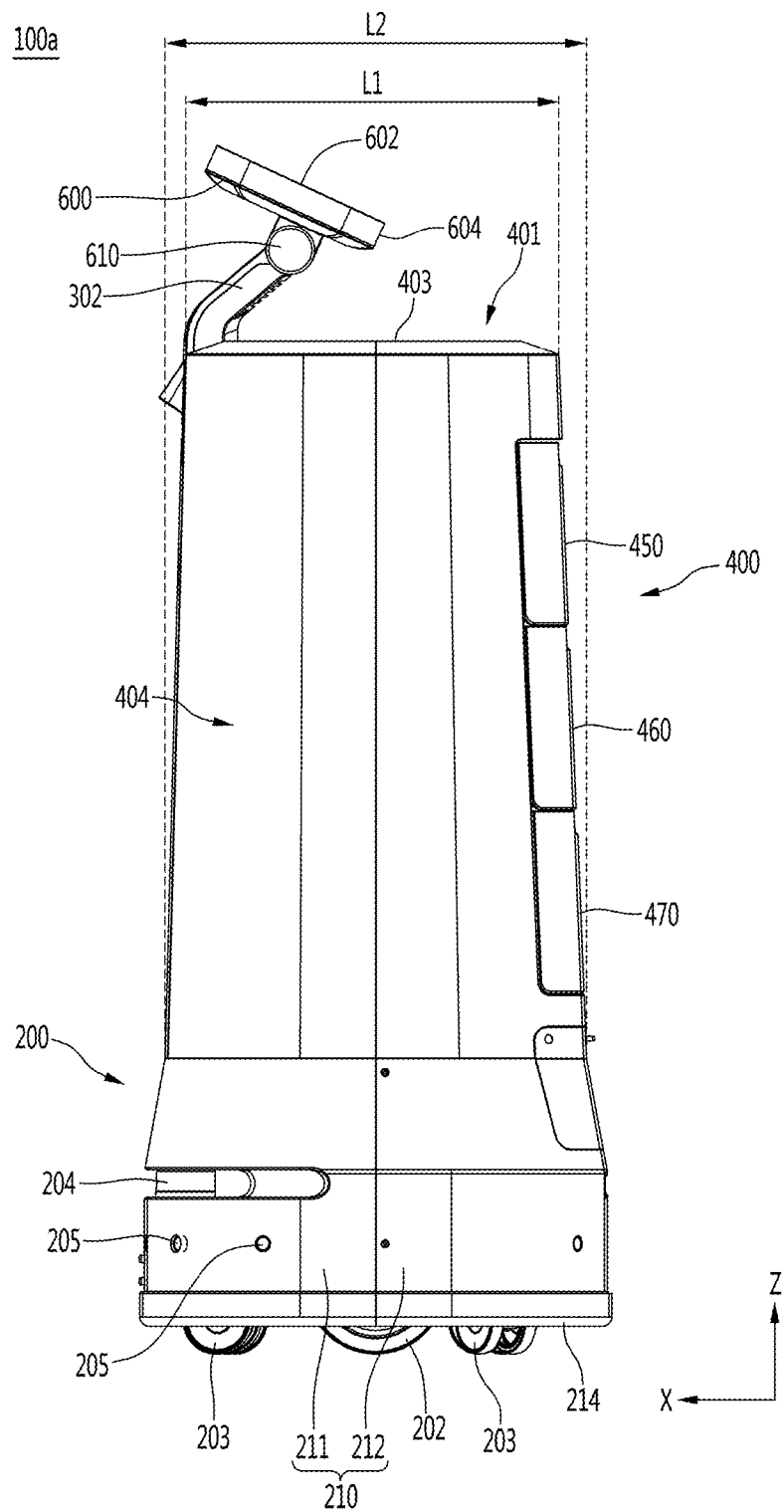
FIG. 7 is a side view of the robot when the display shown in FIG. 6 rotates rearward.
Figure 8:
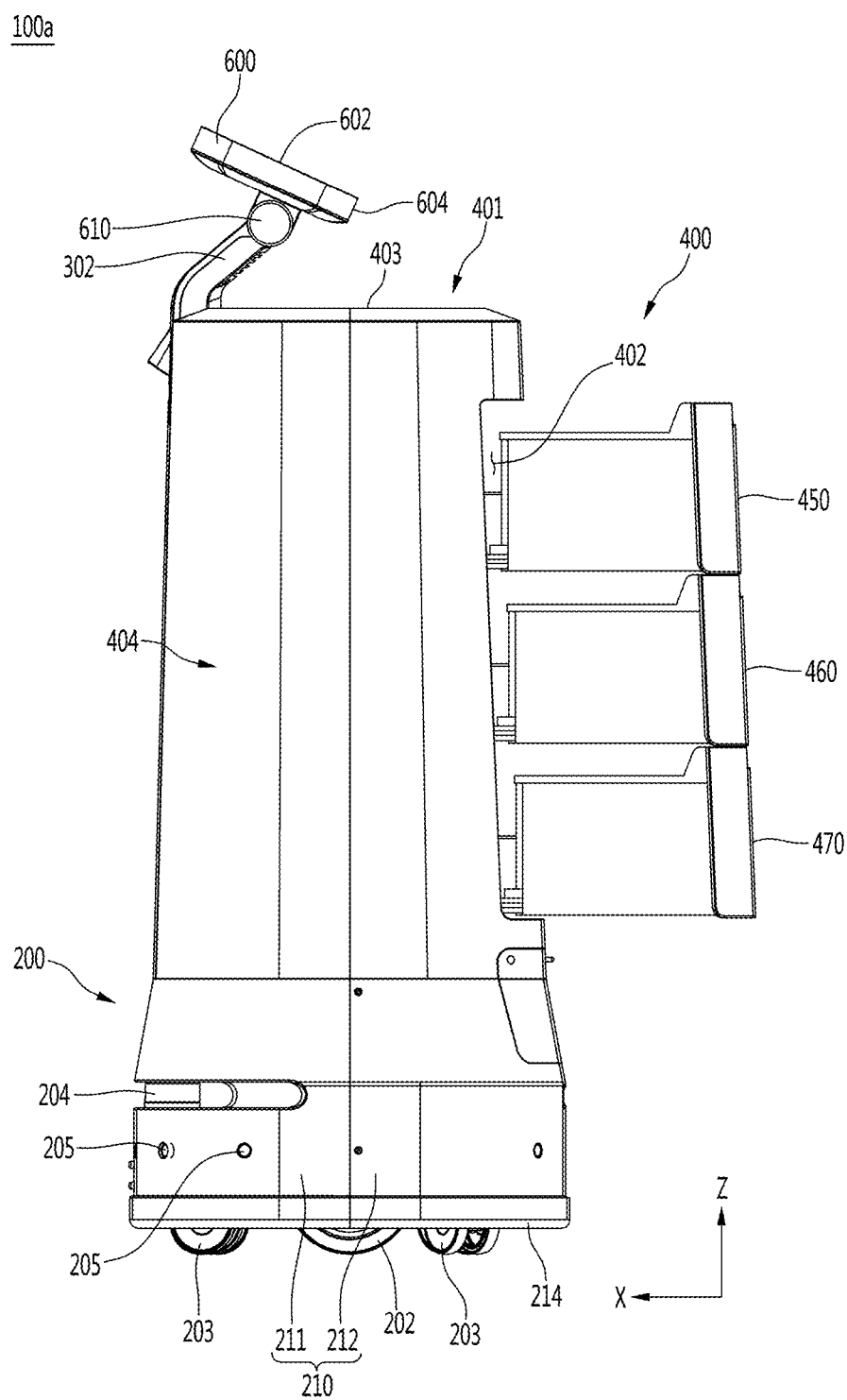
FIG. 8 is a side view of the robot when the drawer shown in FIG. 6 is drawn out rearward.

FIG. 4 is a perspective view of a robot according to an embodiment, FIG. 5 is a perspective view when the service module shown in FIG. 4 is detached from a mobile robot, FIG. 6 is a side view of a robot according to an embodiment, FIG. 7 is a side view when the display shown in FIG. 6 rotates rearward, and FIG. 8 is a side view when the drawer shown in FIG. 6 is drawn out rearward.

The robot 100a may include a mobile robot 200 and a service module 400 mounted on the mobile robot 200.

The mobile robot 200 may be the main body of the robot 100a. The mobile robot 200 may be an autonomous robot capable of autonomously traveling to a destination.

Driving wheels 202 may be disposed in the mobile robot 200. The driving wheels 202 may be disposed on the lower side of the mobile robot 200.

The mobile robot 200 may be provided with at least one caster 203 (e.g., or a plurality of casters). The casters 203 may be disposed on the lower side of the mobile robot 200 to assist traveling of the robot 100a.

The mobile robot 200 may include a lower housing 210, a base plate 214 and a body frame 220 (see FIG. 5).

The lower housing 210 may form the appearance of the mobile robot 200. The lower housing 210 may form the appearance of a circumferential surface of the mobile robot 200. The lower housing 210 may surround the outer circumference of the body frame 220. The upper surface of the lower housing 210 may be opened.

The lower housing 210 may be a combination of a plurality of members. The lower housing 210 may include a front housing 211 and a rear housing 212, thereby facilitating fastening and detaching of the lower housing 210.

The front housing 211 may be convexly curved forward and the rear housing 212 may be convexly curved rearward. The rear end of the front housing 211 and the front end of the rear housing 212 may be in contact with each other. The outer surfaces of the front housing 211 and the rear housing 212 may be continuously connected.

The body frame 220 may be disposed on the base plate 214. The body frame 220 may be disposed inside the lower housing 210, and may be protected by the lower housing 210 and the base plate 214.

The mobile robot 200 may be provided with a lidar 204. An opening 211a, in which the lidar 204 is disposed, may be formed in the lower housing 210. The opening 211a may be opened forward and may be formed to extend in a left-and-right direction Y. The lidar 204 may detect an obstacle or a person located in front of the robot 100a through the opening 211a.

The mobile robot 200 may be provided with a plurality of ultrasonic sensors 205. The plurality of ultrasonic sensors 205 may be spaced apart from each other in the circumferential direction of the mobile robot 200. A plurality of openings, in which the ultrasonic sensors 205 are disposed, may be formed in the outer circumference of the lower housing 210. Each ultrasonic sensor 205 may detect an object located near the robot 100a.

The ultrasonic sensors 205 may be installed at positions lower than that of the lidar 204. More specifically, based on the lower end of the mobile robot 200, the height of the ultrasonic sensors 205 may be less than that of the lidar 204.

The mobile robot 200 may be provided with a charging terminal 206 for charging the robot 100a. A through-hole, through which the charging terminal 206 passes, may be formed in the lower housing 210 and, more specifically, the front housing 211. The charging terminal 206 may protrude forward from the lower housing 210 through the through-hole.

The height of the charging terminal 206 may be less than that of the lidar 204. The charging terminal 206 may be installed at a position less than that of the ultrasonic sensors 205. More specifically, based on the lower end of the mobile robot 200, the height of the charging terminal 206 may be less than the height of the lidar 204 and the height of the ultrasonic sensors 205.

The base plate 214 may form the appearance of the bottom of the mobile robot 200.

The mobile robot 200 may be provided with a frame 300. The frame 300 may extend to protrude upward from the front portion of the mobile robot 200. The frame 300 may be a front frame disposed on a front portion of the mobile robot 200. A display 600 may be disposed on an upper portion of the frame 300. The display 600 may configure the head of the robot 100a (e.g., the display 600 may be a top portion of the robot 100a considered a "head"), and the frame 300 may configure the neck body of the robot 100a.

The frame 300 may be a combination of a plurality of members. The frame 300 may be manufactured separately with the mobile robot 200 and then may be coupled to the upper side of the front portion of the mobile robot 200. A portion of the frame 300 may be integrally formed in the mobile robot 200, and may be formed to protrude upward from the front portion of the mobile robot 200.

The frame 300 may be approximately vertically formed. The frame 300 may be formed to gradually become thin upward. The rear surface of the frame 300 may be vertically disposed, and the front surface of the frame 300 may become closer to the rear surface of the frame 300 upward. The front surface of the frame 300 may configure an inclined surface to be formed to be inclined at a predetermined angle.

The upper portion of the frame 300 may be bent rearward and upward. A display connector 302 rotatably connected with the display 600 may be formed on the upper portion of the frame 300.

The frame 300 may include a gradient portion having an inclined surface formed on a front surface thereof and gradually become thin upward and the display connector 302 extending to the upper side of the service module 400 above the gradient portion.

The display connector 302 may be located above the service module 400 in an upper-and-lower direction Z. The display connector 302 may overlap the upper surface 403 of the service module 400 in the upper-and-lower direction Z. The display connector 302 may be spaced apart from the upper surface 403 of the service module 400 in the upper-and-lower direction Z.

In this case, a user may place an item on the upper surface of the service module 400, thereby improving convenience of the service module 400.

The service module 400 may cover the open upper surface of the lower housing 210 from the upper side. The service module 400 may cover the body frame 220 from the upper side. However, the present disclosure is not limited thereto, and the upper surface of the lower housing 210 may support the service module 400.

The service module 400 may be a combination of a plurality of members. The service module 400 may include a housing 401 and at least one drawer inserted into the housing 401 or drawn out of the housing 401.

The housing 401 may form the appearance of the service module 400.

For example, the housing 401 may be manufactured separately from the mobile robot 200 and then mounted to be seated on the mobile robot 200.

In another example of the housing 401, the whole or a portion of the housing 401 may integrally protrude upward from the mobile robot 200.

An opening 402 (see FIG. 8), through which the drawer (or drawers 450, 460, 470) moves into or out of the housing 401, may be formed in the housing 401. The opening 402 may be formed in the rear surface of the housing 401. The opening 402 may be formed in the rear portion of the housing 401 to be opened in a front-and-rear direction X.

The drawer (or drawers 450, 460, 470) may be moved out of the housing 401 to be drawn out of the housing 401, and may be moved from the outside of the housing 401 to the inside of the housing 401 to be accommodated in the housing 401.

The drawer (or drawers 450, 460, 470) may be moved rearward in the housing 401 to be drawn out of the housing 401, and may be moved from the rear side of the housing 401 to the inside of the housing 401 to be accommodated in the housing 401.

The housing 401 may include an outer housing 404 forming the appearance of the service module 400.

The outer circumferential surface of the outer housing 404 may include a curved surface.

The upper surface 403 of the outer housing 404 may have a planar shape, and the upper surface 403 of the outer housing 404 may be spaced apart from the display 600 located thereabove in the upper-and-lower direction Z.

The outer housing 404 may include a pair of side bodies 405 and 406. The front ends of the pair of side bodies 405 and 406 may be spaced apart from each other in the left-and-right direction Y. The opening 402 which is open in the front-and-rear direction X may be formed between the rear ends of the pair of side bodies 405 and 406.

The housing 401 may include a front body 407 surrounding the rear surface and the side surface of the frame 300. The front body 407 may be a portion of the outer housing 404.

The front body 407 may be interposed between the pair of side bodies 405 and 406 configuring the outer housing 404.

The front body 407 may include a left plate 407a, a right plate 407b and a rear plate 407c.

The left plate 407a and the right plate 407b of the front body 407 may be spaced apart from each other in the left-and-right direction Y.

The rear plate 407c of the front body 407 may be formed to connect the rear portions of the left plate 407a with the right plate 407b.

The left plate 407a of the front body 407 may cover the left surface of the frame 300.

The right plate 407b of the front body 407 may cover the right surface of the frame 300.

The rear plate 407c of the front body 407 may cover the rear surface of the frame 300.

A drawer guide capable of guiding movement of the drawer may be disposed in the housing 401. A plurality of drawer guides 420, 430 and 440 may be provided in the service module 400, and the plurality of drawer guides 420, 430, 440 may be disposed in the housing 401 with height differences.

The plurality of drawer guides 420, 430 and 440 may be manufactured with the same size and shape and then mounted in the housing 401, thereby minimizing the manufacturing cost of the robot 100a.

A plurality of drawers may be provided in the housing 401, and the plurality of drawers 450, 460 and 470 may be manufactured with the same size and shape and then mounted in the drawer guides, thereby minimizing the manufacturing cost of the robot 100a.

When the plurality of drawer guides 420, 430 and 440 is disposed in the housing 401 with the height differences, the plurality of drawers 450, 460 and 470 may be disposed in the housing 401 with height differences.

Hereinafter, for convenience of description, the uppermost drawer 450 located at the uppermost side among the plurality of drawer 450, 460 and 470 may be referred to as a first drawer 450, the drawer 460 closest to the first drawer 450 under the first drawer 450 may be referred to as a second drawer 460, and the lowermost drawer 470 located at the lowermost side among the drawers 450, 460 and 470 may be referred to as a third drawer 470.

Meanwhile, the robot 100a is not limited to including three drawers 450, 460 and 470, and the robot may include one drawer, two drawers or four or more drawers having any shape and size. Hereinafter, for convenience of description, assume that three drawers 450, 460 and 470 are disposed.

Hereinafter, the common configuration of the first drawer 450, the second drawer 460 and the third drawer 470 may be referred to as the drawers 450, 460 and 470.

The plurality of drawer guides 420, 430 and 440 may include a first drawer guide 420 for guiding the first drawer 450 and a second drawer guide 430 located under the first drawer guide 420 to guide the second drawer 460.

The plurality of drawer guides 420, 430 and 440 may further include a third drawer guide 440 located under the second drawer guide 430 to guide the third drawer 470.

Hereinafter, the common configuration of the first drawer guide 420, the second drawer guide 430 and the third drawer guide 440 may be referred to as the drawer guides 420, 430 and 440.

The plurality of drawer guides 420, 430 and 440 may be disposed in the housing 401 to be spaced apart from each other in the upper-and-lower direction Z.

Meanwhile, the robot 100a may further include the display 600. The robot 100a may include a display rotor 610 for rotating the display 600.

The display 600 may be rotatably installed in the mobile robot 200, the frame 300 or the service module 400. The display 600 may configure a head rotatably disposed at the upper portion of the frame 300. The display 600 may be a front head disposed above the front portion of the robot 100a in the front-and-rear direction X.

A screen 602 may be a touchscreen and may be provided on one surface of the display 600, and a variety of information may be displayed through the screen 602.

The width of the display 600 in the left-and-right direction Y may be less than that of the service module 400 in the left-and-right direction Y.

The display 600 may be provided with a scanner 604. The scanner 604 may be configured to scan a barcode and/or a QR code. The user may tag the scanner 604 with a barcode and/or a QR code to confirm the authenticated user and use the robot 100a.

When the display 600 is erected to face a front upper side as shown in FIG. 6, the scanner 604 may face the rear upper side at the upper side of the display 600. When the display 600 is rotated to face a rear upper side as shown in FIG. 7, the scanner 604 may face a rear lower side.

A display rotor 610 may be installed in the frame 300. The display rotor 610 may rotate the display 600 in a plurality of modes. The display rotor 610 may rotate the display 600 such that the display 600 is tilted about a horizontal shaft positioned horizontally.

The display rotor 610 may include a motor installed in the frame 300, and at least one power transmission member for connecting the motor with the horizontal shaft of the display 610. When the motor is driven, the display 600 may be rotated about the horizontal shaft.

The display 600 may be defined as having a plurality of modes according to the angle thereof. The plurality of modes may include a first mode in which the screen 602 of the display 600 faces a front upper side and a second mode in which the screen 602 of the display 600 faces a rear upper side.

The display 600 may display different information in the first mode and the second mode.

The first mode may be executed when the mobile robot 200 travels. The display 600 may display an image, an emoticon a picture or the like representing a smiley face on the screen 602 in the first mode. A pedestrian around the robot 100a may view an image or a picture displayed through the screen 602 of the display 600 and recognize that the robot 100a is currently traveling.

The second mode may be executed when the mobile robot 200 is stopped without traveling. The display 600 may display at least one menu item selectable by the user in the second mode, and the user may touch a menu item displayed through the screen of the display 600 to input various commands.

While the robot 100a travels to a destination, the screen 602 of the display 600 may face the front upper side as shown in FIG. 6, and the display 600 may display an image, an emoticon, a picture, etc. through the screen 602.

When the robot 100a arrives at the destination, the display rotor 610 may rotate the display 600 as shown in FIG. 7, and the screen 602 of the display 600 may face the rear upper side (e.g., in the second mode). In this case, the display 600 may display at least one menu item capable of being input by the user through the screen 602.

Meanwhile, the service module 400 may be formed such that the user easily approaches the display 600 while minimizing overturning of the robot 100a.

The horizontal length L1 of the upper end of the service module 400 may be less than the horizontal length L2 of the lower end of the service module 400. The upper end of the housing 401 may be the upper end of the service module 400, and the lower end of the housing 401 may be the lower end of the service module 400. In this case, the horizontal length L1 of the upper end of the housing 401 may be less than the horizontal length L2 of the lower end of the housing 401.

In addition, the service module 400 may gradually become thin upward when each of the plurality of drawers 450, 460 and 470 is maximally inserted into the housing 401.

When the lower portion of the service module 400 is thick and the upper portion of the service module 400 is thin, the center of gravity of the service module 400 may be lowered and the periphery of the upper portion of the service module 400 may be used as a space for enabling approaching of the user.

When the center of gravity of the robot 100a is low, the possibility of overturning the robot 100a may be minimized.

Meanwhile, the user may approach the display 600 as close as possible in a state of being located in the vicinity of the service module 400 (more particularly, next to or behind the service module 400), and recognize information on the display 600, and input various commands through the display 600. In addition, the user can easily scan a barcode and/or a QR code on the scanner 604.

Figure 9:
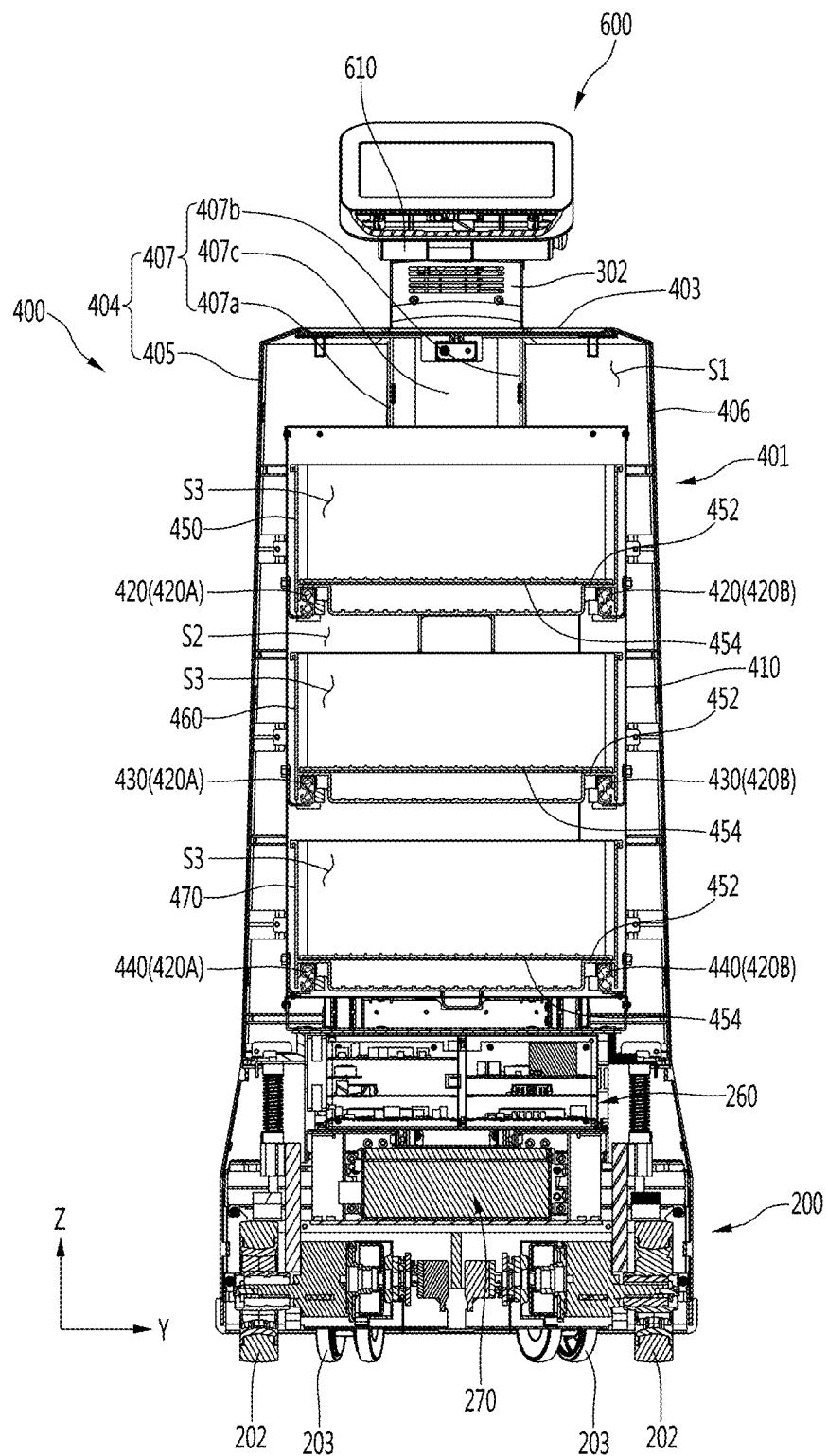
FIG. 9 is a cross-sectional view of the robot taken along line A-A' of FIG. 4.
Figure 10:
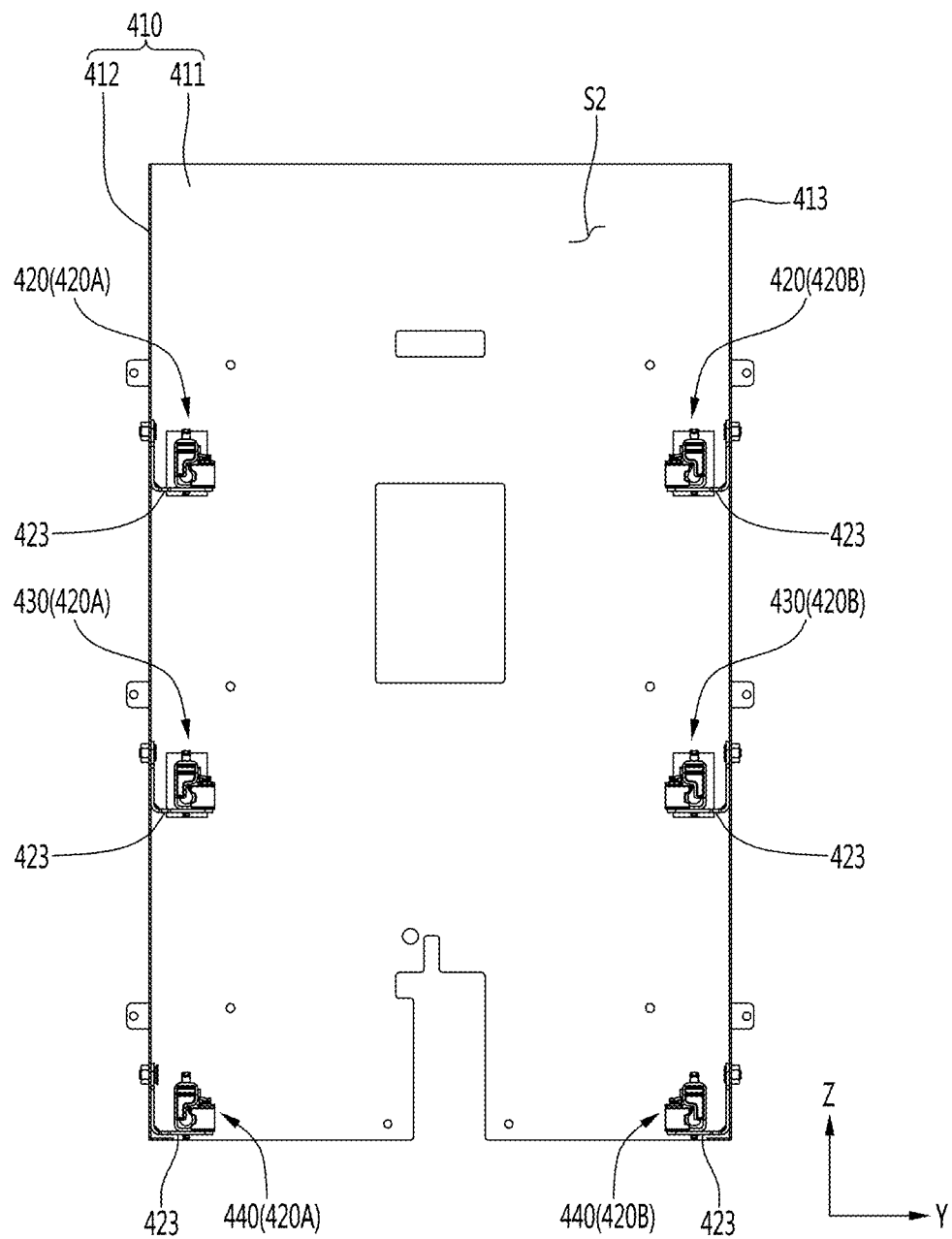
FIG. 10 is a rear view of the inner housing of the robot shown in FIG. 9.
Figure 11:
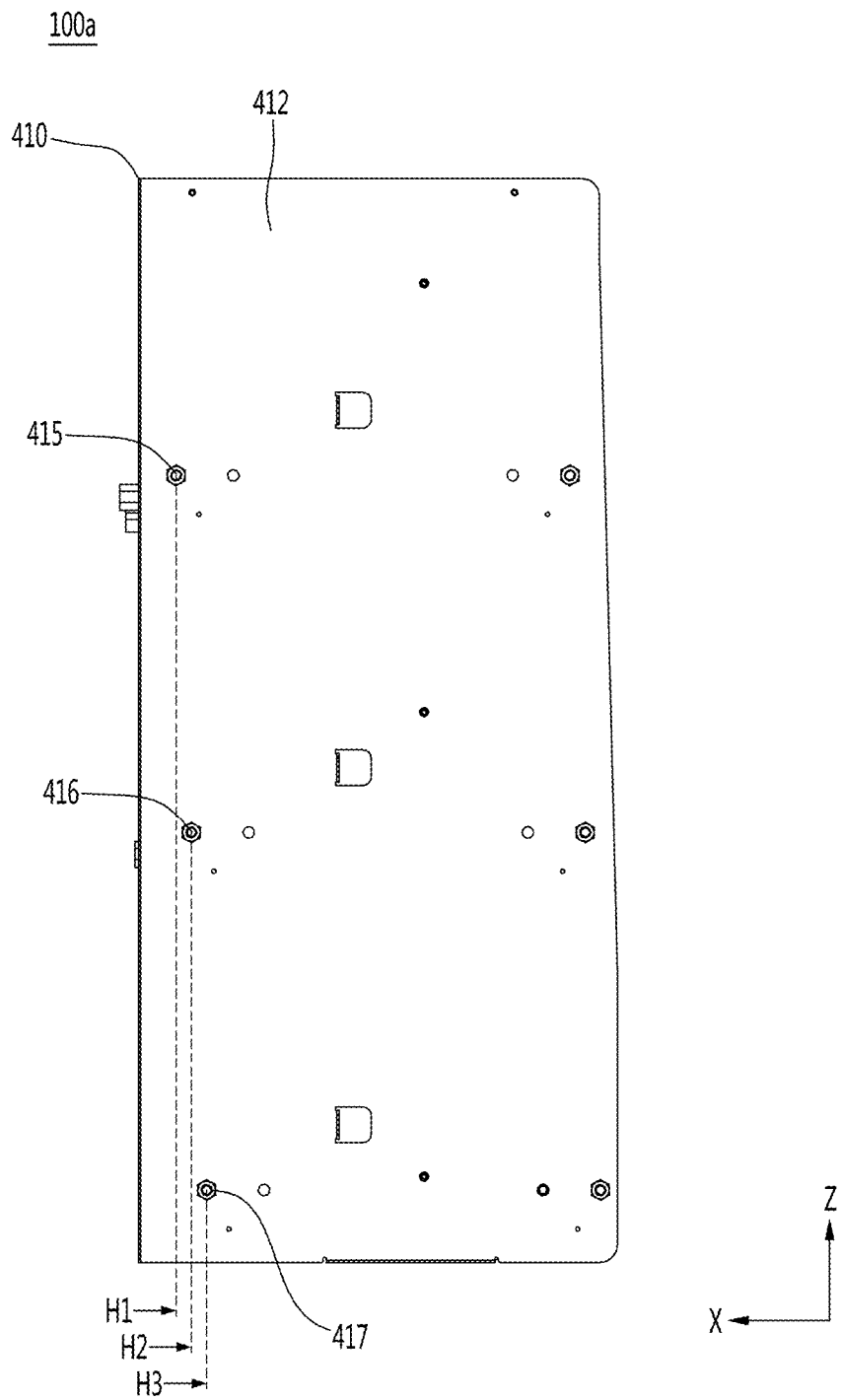
FIG. 11 is a side view of the inner housing of the robot shown in FIG. 9.

FIG. 9 is a cross-sectional view taken along line A-A' of FIG. 4, FIG. 10 is a rear view of the inner housing shown in FIG. 9, and FIG. 11 is a side view of the inner housing shown in FIG. 9.

Figure 12:
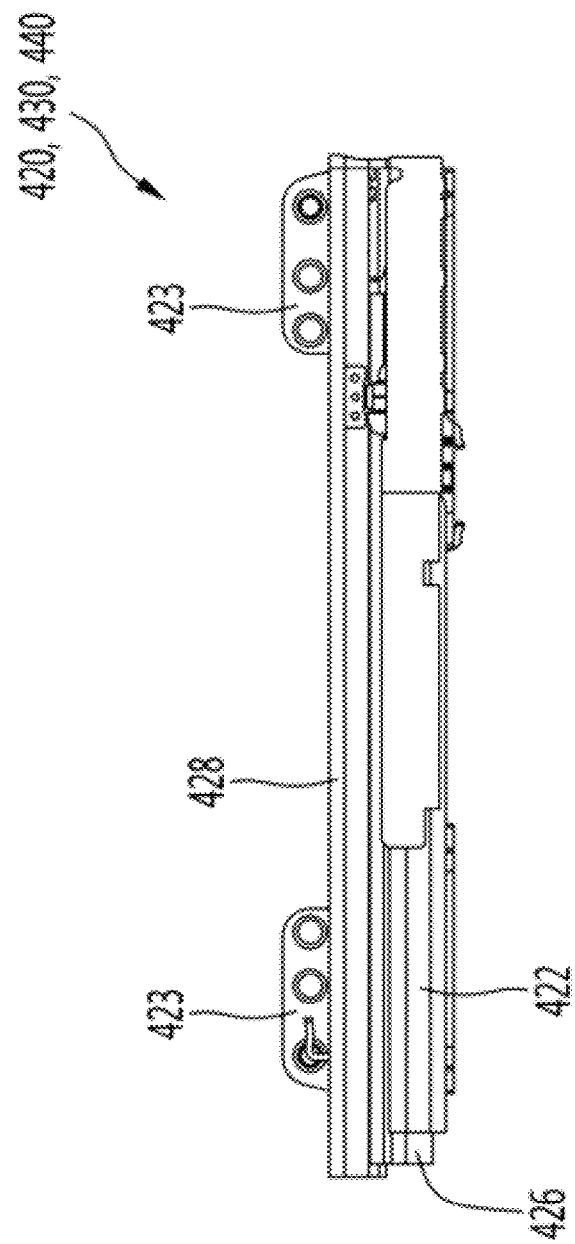
FIG. 12 is a side view of a drawer guide of the robot when a drawer according to the present disclosure is located at a maximum drawn-in position.
Figure 13:
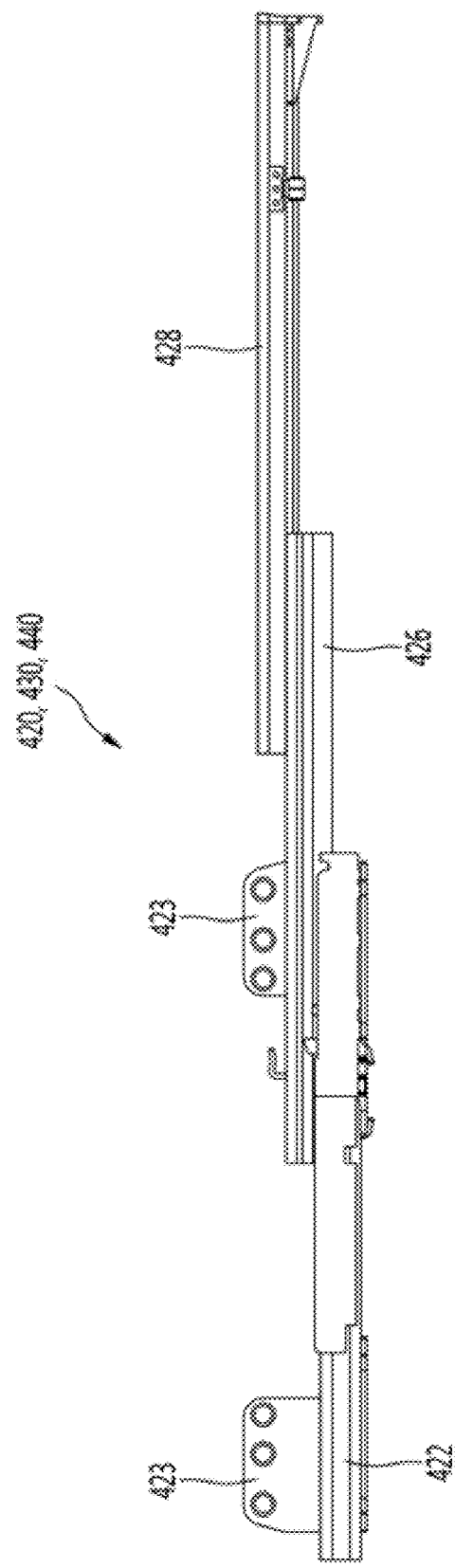
FIG. 13 is a side view of a drawer guide of the robot when a drawer according to the present disclosure is located at a maximum drawn-out position.

FIG. 12 is a side view of a drawer guide when a drawer according to the present disclosure is located at a maximum drawn-in position, and FIG. 13 is a side view of a drawer guide when a drawer according to the present disclosure is located at a maximum drawn-out position.

The housing 401 may be a combination of a plurality of members. The housing 401 may include the outer housing 404 and an inner housing 410 disposed inside the outer housing 404.

The outer housing 404 may have an open lower surface. A space S1 (see FIG. 9), in which the inner housing 410 is accommodated, may be formed in the outer housing 404.

The outer housing 404 may include a pair of side bodies 405 and 406, and the pair of side bodies 405 and 406 may cover the outer side surface of the inner housing 410. The front body 407 of the outer housing 404 may be disposed in front of the inner housing 410.

The inner housing 410 may be smaller than the outer housing 404, and may be accommodated in the space S1 formed in the outer housing 404.

The inner housing 410 may have an open rear surface. An inner space S2, in which the plurality of drawers 450, 460 and 470 is accommodated, may be formed in the inner housing 410. As shown in FIG. 10, the inner housing 410 may include a front plate 411, a left plate 412 and a right plate 413.

Each of the drawer guides 420, 430 and 440 may include a fixed bracket 422 and a moving bracket moving along the fixed bracket 422, as shown in FIGS. 12 and 13.

The fixed bracket 422 may be installed in the housing 401. The fixed bracket 422 may be fastened to a guide bracket 423 installed in the housing 401. The guide bracket 423 may be fixed to the housing 401 by fastening members such as a bolt and a nut or a screw. The fixed bracket 422 may be fastened to the housing 401 by the guide bracket 423.

Each of the drawer guides 420, 430 and 440 may include a pair of moving brackets 426 and 428, and the pair of brackets 426 and 428 may include the first moving bracket 426 guided along the fixed bracket 422 and the second moving bracket 428 guided along the first moving bracket 426.

The moving brackets 426 and 428 may move along the fixed bracket 422 and a portion thereof may be drawn out of the housing 401 through the opening 402 (see FIG. 8).

Each of the plurality of drawer guides 420, 430 and 440 may include a pair of guides 420A and 420B spaced apart from each other in the left-and-right direction Y. Each of the pair of guides 420A and 420B may include the fixed bracket 422 and the pair of moving brackets 426 and 428.

A mounting hole, in which the fixed bracket 422 of each of the plurality of drawer guides 420, 430 and 440 is mounted, may be formed in the inner housing 410.

In the inner housing 410, as shown in FIG. 11, a first mounting hole 415, in which the fixed bracket 422 of the first drawer guide 420 is mounted, may be formed and a second mounting hole 416, in which the fixed bracket 422 of the second drawer guide 430 is mounted, may be formed. In addition, a third mounting hole 417, in which the fixed bracket 422 of the third drawer guide 440 is mounted, may be formed in the inner housing 410, as shown in FIG. 11.

The service module 400 may be formed such that the horizontal width thereof is gradually reduced upward, and, when the robot 100a includes the drawer guides 420, 430 and 440 having the same size and shape, the plurality of drawer guides 420, 430 and 440 may be mounted in the inner housing 410 with a step difference.

In this case, the distance H1 between the first mounting hole 415 and the frame 300 may be less than the distance H2 between the second mounting hole 416 and the frame 300. In addition, the distance H2 between the second mounting hole 416 and the frame 300 may be less than the distance H3 between the third mounting hole 417 and the frame 300.

The plurality of drawer guides 420, 430 and 440 may be mounted to become closer to the frame 300 upward.

Each of the drawers 450, 460 and 470 may have an open upper surface, and a drawer space S3, in which items such as medicine and medical supplies may be accommodated, may be formed in each of the drawers 450, 460 and 470.

A pocket 452 may be formed on the bottom of each of the drawers 450, 460 and 470. The drawer guides 420, 430, 440 may be accommodated in the respective pocket 452. Each pocket 452 may surround the upper surface, the left surface and the right surface of the respective drawer guide 420, 430, 440. The pocket 452 may be provided to protrude toward the drawer space S3.

The pocket 452 may include a left plate, a right plate and an upper plate. The pocket 452 may surround the upper surface, the left surface and the right surface of the drawer guide. The pocket 452 may be formed at each of the left and right sides of the lower plate of the drawer. The left plate and the right plate of the pocket 452 may be located next to the drawer guides 420, 430 and 440 to cover the drawer guides 420, 430 and 440 such that the drawer guides 420, 430 and 440 are invisible (e.g., not visible) at the side of the robot 100a.

When the drawers 450, 460 and 470 are drawn out as shown in FIG. 8, the drawers 450, 460 and 470 may cover the drawer guides 420, 430 and 440 as much as possible, and the overall appearance of the robot 100a may be enhanced.

The service module 400 may further include a shelf 454 (see FIG. 9) placed on the upper surface of the upper plate of the pocket 452.

In the drawer space S3 of the drawers 450, 460 and 470, the pockets 452 may protrude upward with a step difference, the shelf 454 may cover the pockets 452 above the pockets 452, and the items such as medicine and medical supplies may be guided not to be caught between the pockets 452.

The shelf 454 may be drawn over the drawers 450, 460 and 470 when there is a lot of items to be stored in the drawers 450, 460 and 470. In this case, the volume of items which may be stored in the drawers 450, 460 and 470 may be maximized.

Figure 14:
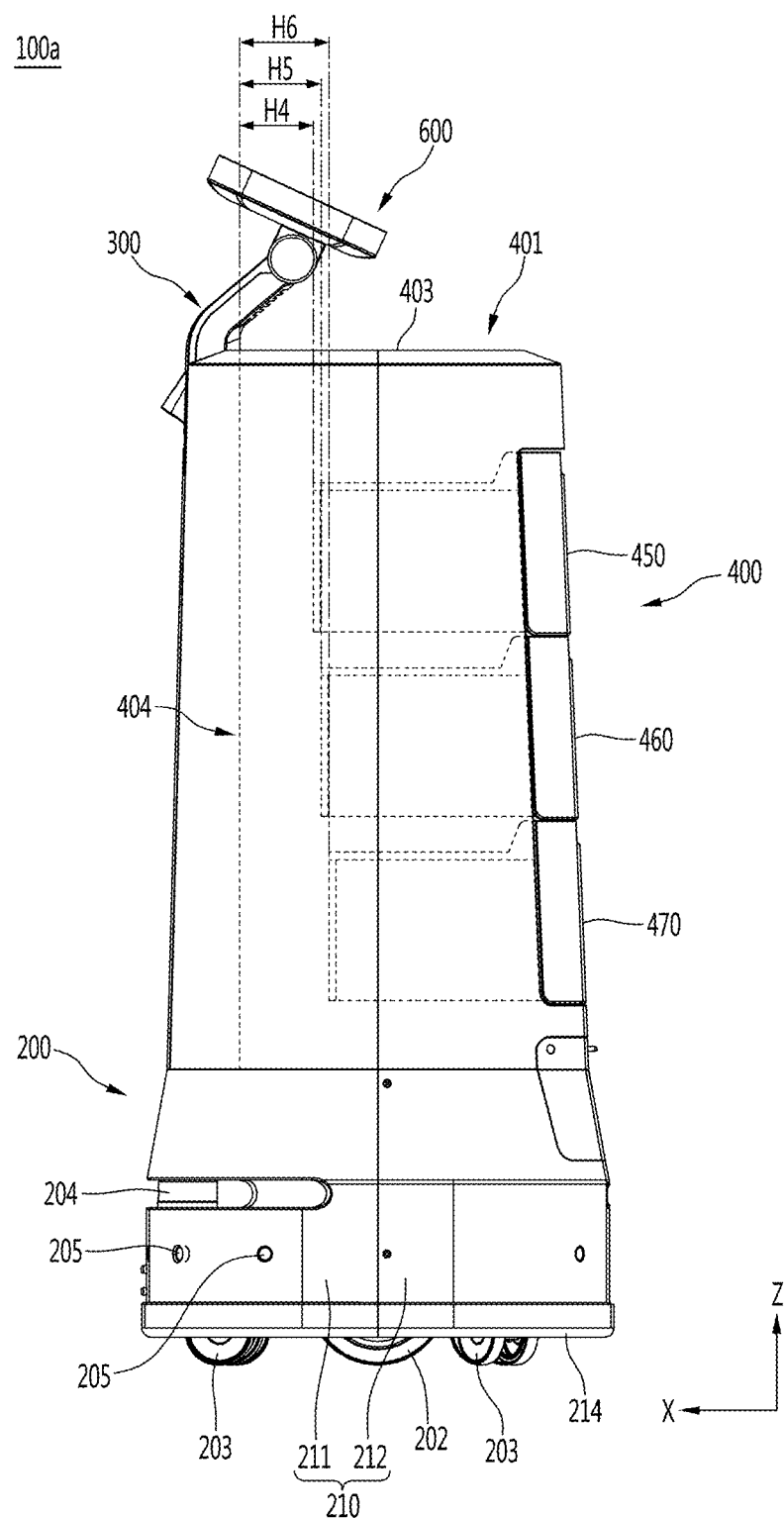
FIG. 14 is a side view when insertion of a plurality of drawers of the robot according to an embodiment into a housing of the robot is completed.

FIG. 14 is a side view when insertion of a plurality of drawers according to an embodiment into a housing is completed.

The service module 400 of the robot 100a may become thin upward and, when the robot 100a includes the plurality of drawers 450, 460 and 470 having the same size and shape, the plurality of drawers 450, 460 and 470 may be disposed with a step difference in the front-and-rear direction.

In this case, the distance H4 between the first drawer 450 and the frame 300 may be less than the distance H5 between the second drawer 460 and the frame 300, as shown in FIG. 14. In addition, the distance H5 between the second drawer 460 and the frame 300 may be less than the distance H6 between the third drawer 470 and the frame 300, as shown in FIG. 14.

The distance between each of the plurality of drawers 450, 460 and 470 and the frame 300 may be defined by a distance in the front-and-rear direction X.

The plurality of drawers 450, 460 and 470 may be disposed to become closer to the frame 300 upward and become farther from the frame 300 downward.

As described above, when the plurality of drawers 450, 460 and 470 has a step difference in the front-and-rear direction X, the service module 400 including the plurality of drawers 450, 460 and 470 may gradually become smaller upward and gradually become larger downward.

Figure 15:
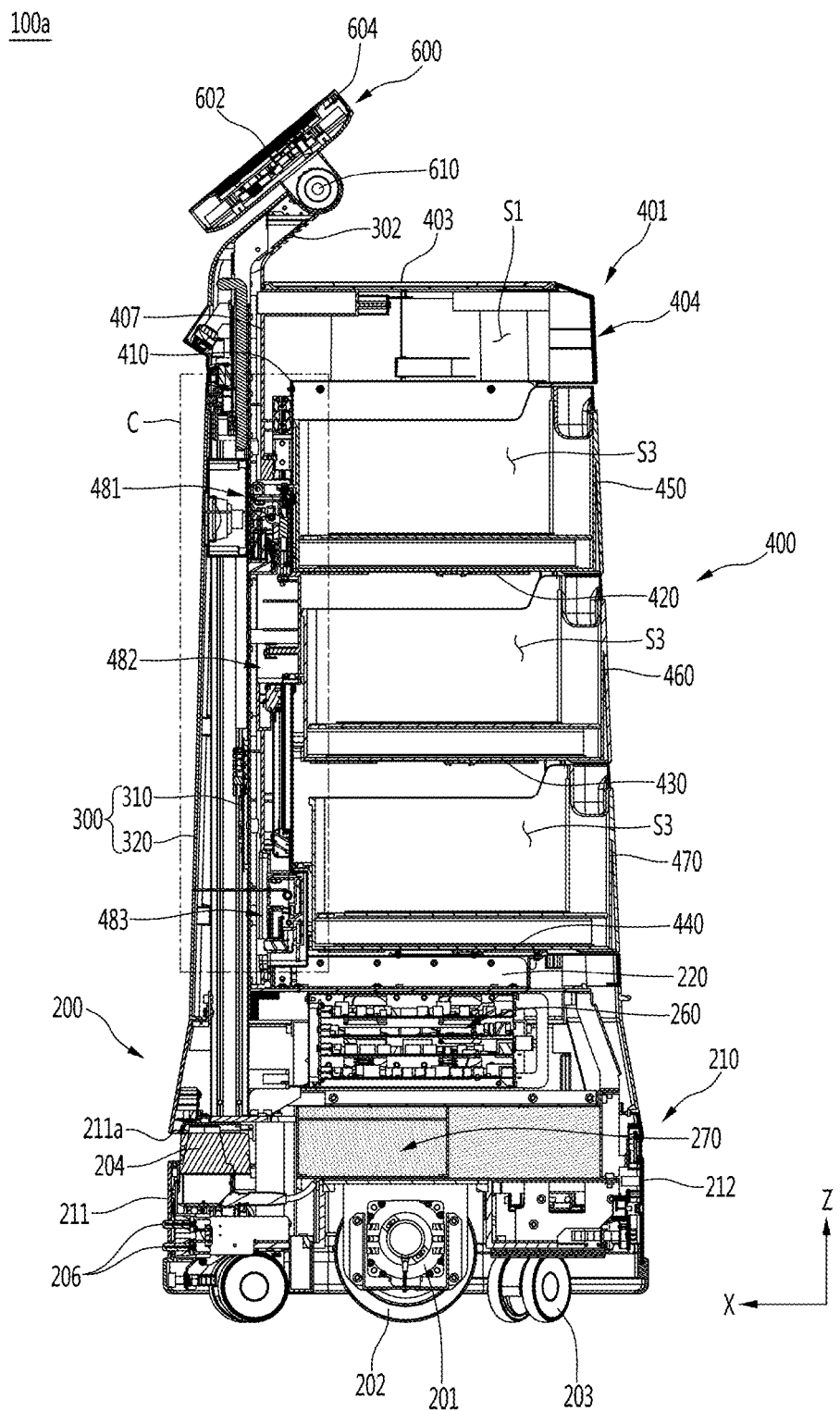
FIG. 15 is a cross-sectional view of the robot taken along line B-B' of FIG. 4.

FIG. 15 is a cross-sectional view taken along line B-B' of FIG. 4.

The mobile robot 200 may be provided with a driving motor 201 for rotating the driving wheels 202. The driving motor 201 may be provided in the body frame 220. The driving motor 201 may be located at a height lower than that of the battery 270. The driving motor 201 may be located inside the lower housing 210.

The robot 100*a* may dock the charging terminal 206 in a charging station (e.g., charger), and the charging station may charge the battery 270 installed in the robot 100*a* through the charging terminal 206.

In the mobile robot 200, a control rack 260 and the battery 270 may be installed. More specifically, the control rack 260 and the battery 270 may be located inside the lower housing 210 and may be mounted in the body frame 220.

The control rack 260 may include a plurality of boards for operation of the robot 100*a*. For example, the control rack 260 may include a main control board for controlling overall operation of the robot 100*a* and a power board electrically connected to the battery 270.

The battery 270 may supply power necessary for operation of the robot 100*a*. The battery 270 may be electrically connected to the charging terminal 206, and the battery 270 may be charged through the charging terminal 206.

The battery 270 may be located below the control rack 260. That is, since the battery 270 having a relatively larger weight is located at the lower side of the mobile robot 200, the center of weight of the mobile robot 200 may be low, such that the robot 100*a* stably travels.

The height of the upper end of the frame 300 may be greater than that of the upper surface 413 of the service module 400.

The frame 300 may be a combination of a plurality of members. The frame 300 may include a front neck 310 and a front cover 320 covering the front surface of the front neck 310.

As shown in FIG. 15, when the service module 400 is coupled to the mobile robot 200, the front neck 310 may be disposed at the front side of the housing 401 and, more particularly, the outer housing 404, and may be disposed between the front body 407 of the outer housing 404 and the front cover 320.

The robot 100*a* may include lockers disposed in the housing 401 to lock or unlock the drawers 450, 460 and 470.

The lockers may be mounted in the housing 401 and, more particularly, the outer housing 404. The lockers may be mounted on the front body 407 and, more particularly, on the rear plate 407*c* of the front body 407.

The lockers may one-to-one-correspond to the drawers 450, 460 and 470, and the plurality of lockers 481, 482 and 483 may be disposed in the robot 100*a*.

The plurality of lockers 481, 482 and 483 may include a first locker 481 for locking or unlocking the first drawer 450 and a second locker 482 for locking or unlocking the second drawer 460.

The plurality of lockers 481, 482 and 483 may further include a third locker 483 for locking or unlocking the third drawer 470.

Hereinafter, the common configuration of the first locker 481, the second locker 482 and the third locker 483 is referred to as the lockers 481, 482 and 483.

The plurality of lockers 481, 482 and 483 may be installed in the housing 401 and, more particularly, the outer housing 404, and, more particularly, may be installed on the front body 407.

The plurality of lockers 481, 482 and 483 may be disposed in the front body 407 to overlap each other in the upper-and-lower direction Z.

Among the plurality of lockers 481, 482 and 483, the first locker 481 may be disposed to be located at the uppermost side, the second locker 482 may be disposed below the first locker 481, and the third locker 483 may be disposed below the second locker 482.

Figure 16:
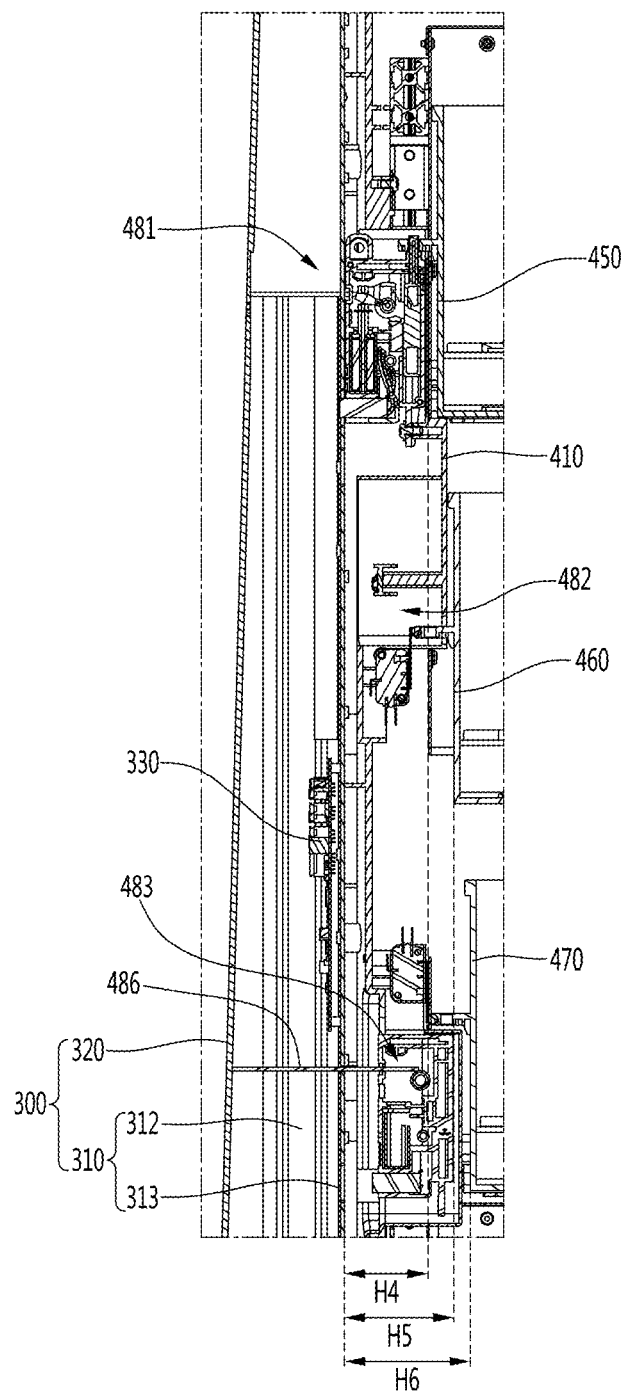
FIG. 16 is an enlarged cross-sectional view of a portion C of the robot shown in FIG. 15.
Figure 17:
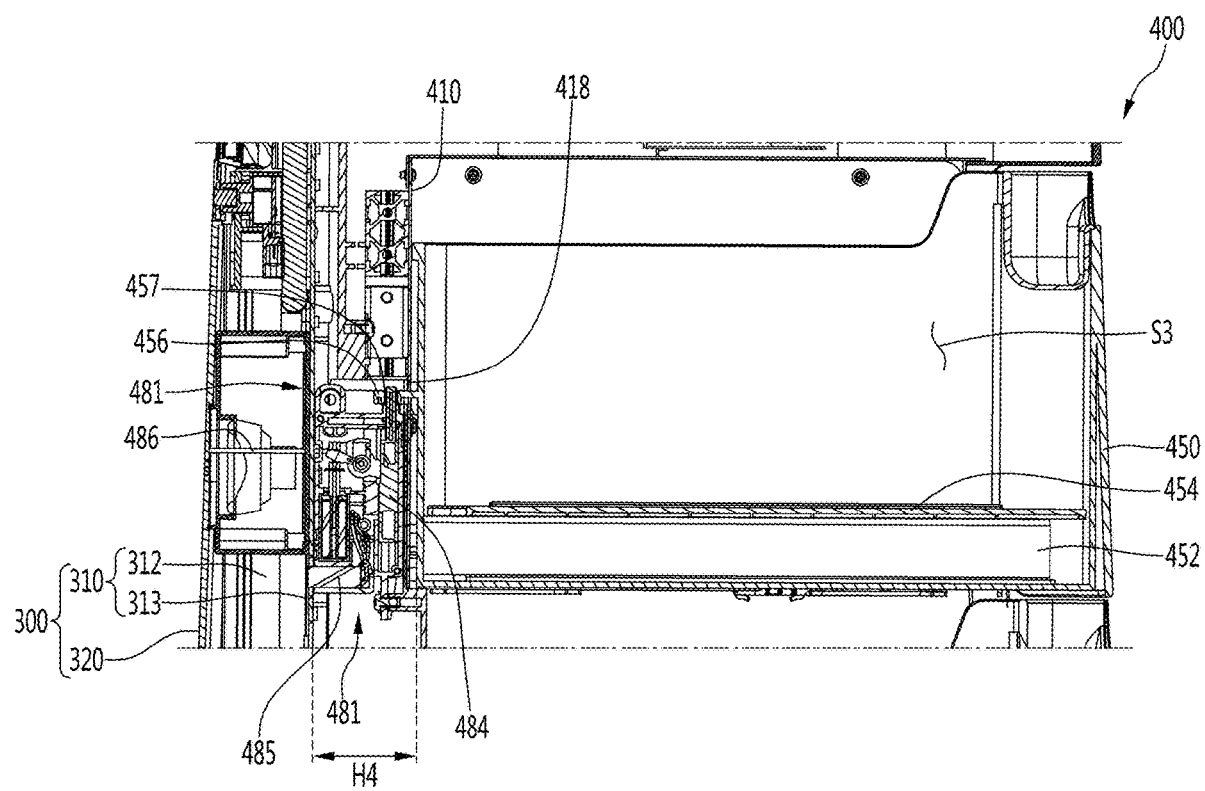
FIG. 17 is a cross-sectional view of the robot showing a first locker and a first drawer according to an embodiment.
Figure 18:
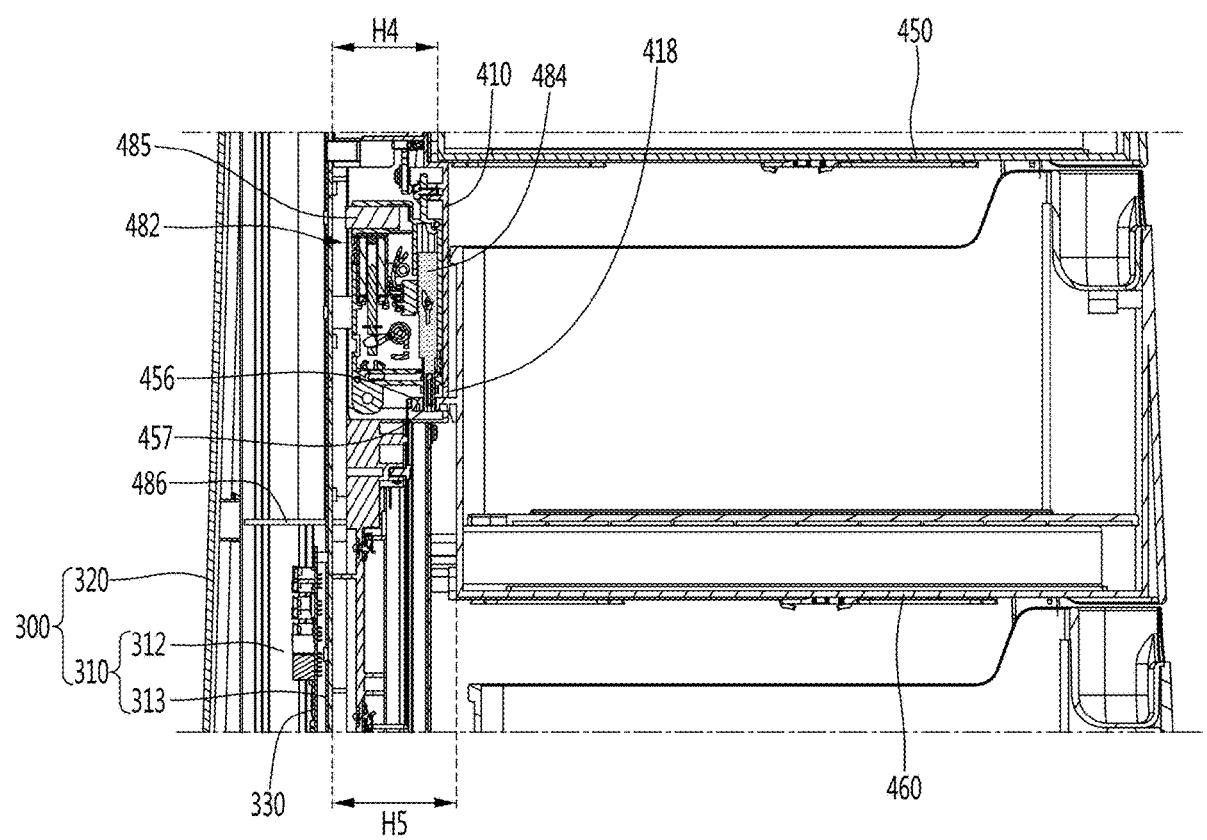
FIG. 18 is a cross-sectional view of the robot showing a second locker and a second drawer according to an embodiment.
Figure 19:
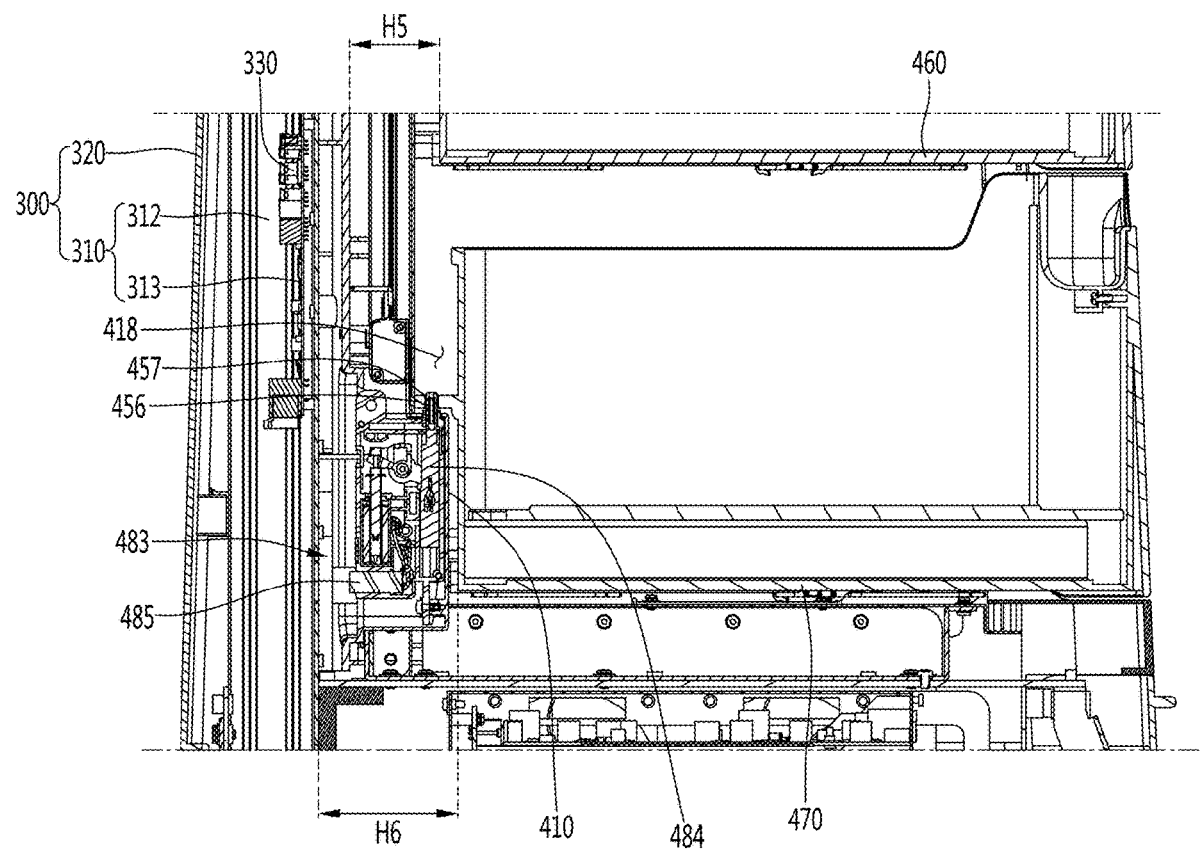
FIG. 19 is a cross-sectional view of the robot showing a third locker and a third drawer according to an embodiment.
Figure 20:
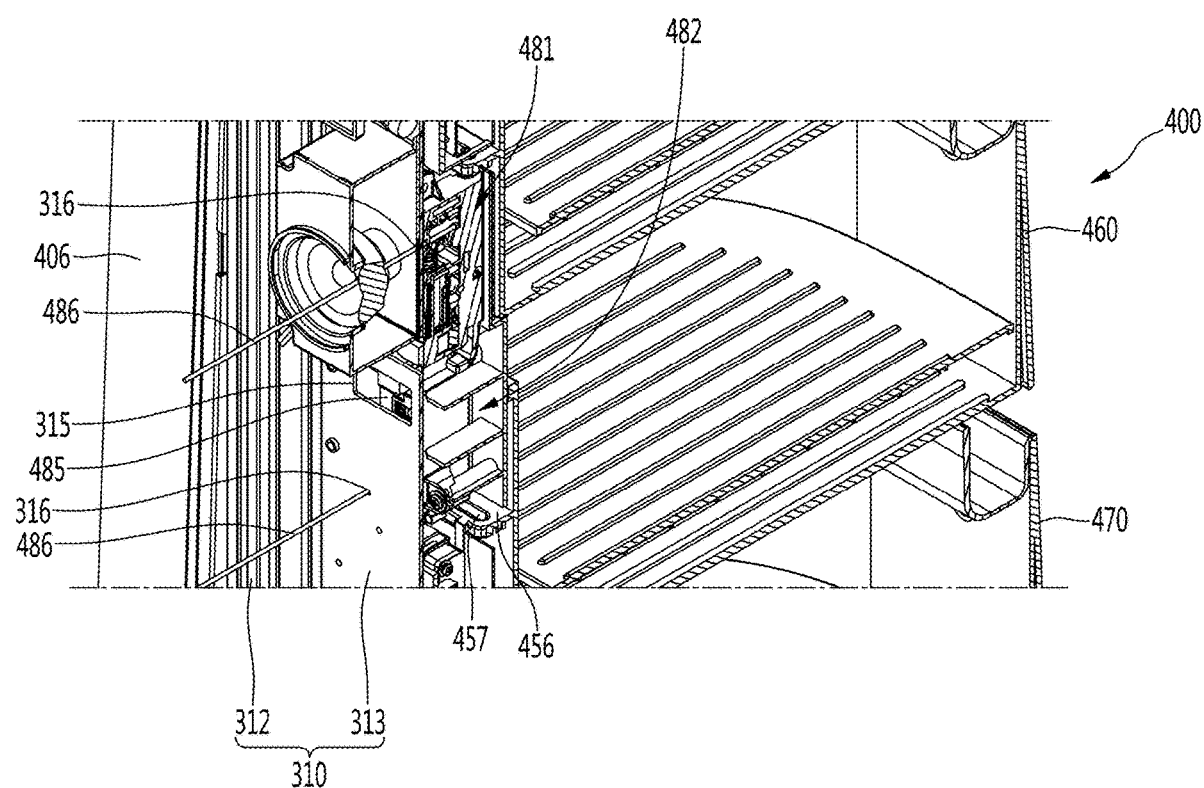
FIG. 20 is a partially cutaway perspective view of the robot showing a first lock and a second locker according to an embodiment.

FIG. 16 is an enlarged cross-sectional view of a portion C shown in FIG. 15, FIG. 17 is a cross-sectional view showing a first locker and a first drawer according to an embodiment, FIG. 18 is a cross-sectional view showing a second locker and a second drawer according to an embodiment, FIG. 19 is a cross-sectional view showing a third locker and a third drawer according to an embodiment, and FIG. 20 is a partially cutaway perspective view showing a first lock and a second locker according to an embodiment.

Figure 21:
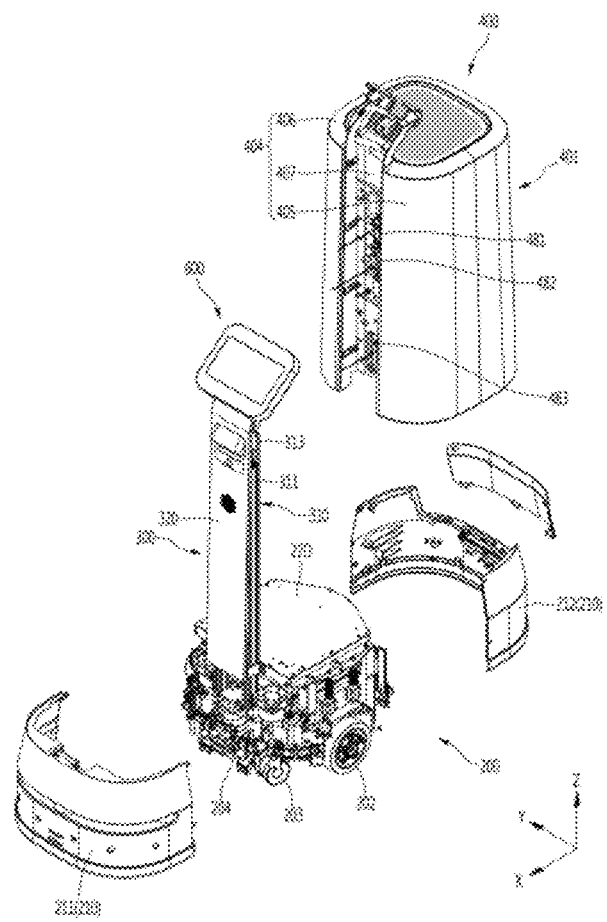
FIG. 21 is an exploded perspective view of a robot according to the present disclosure.
Figure 22:
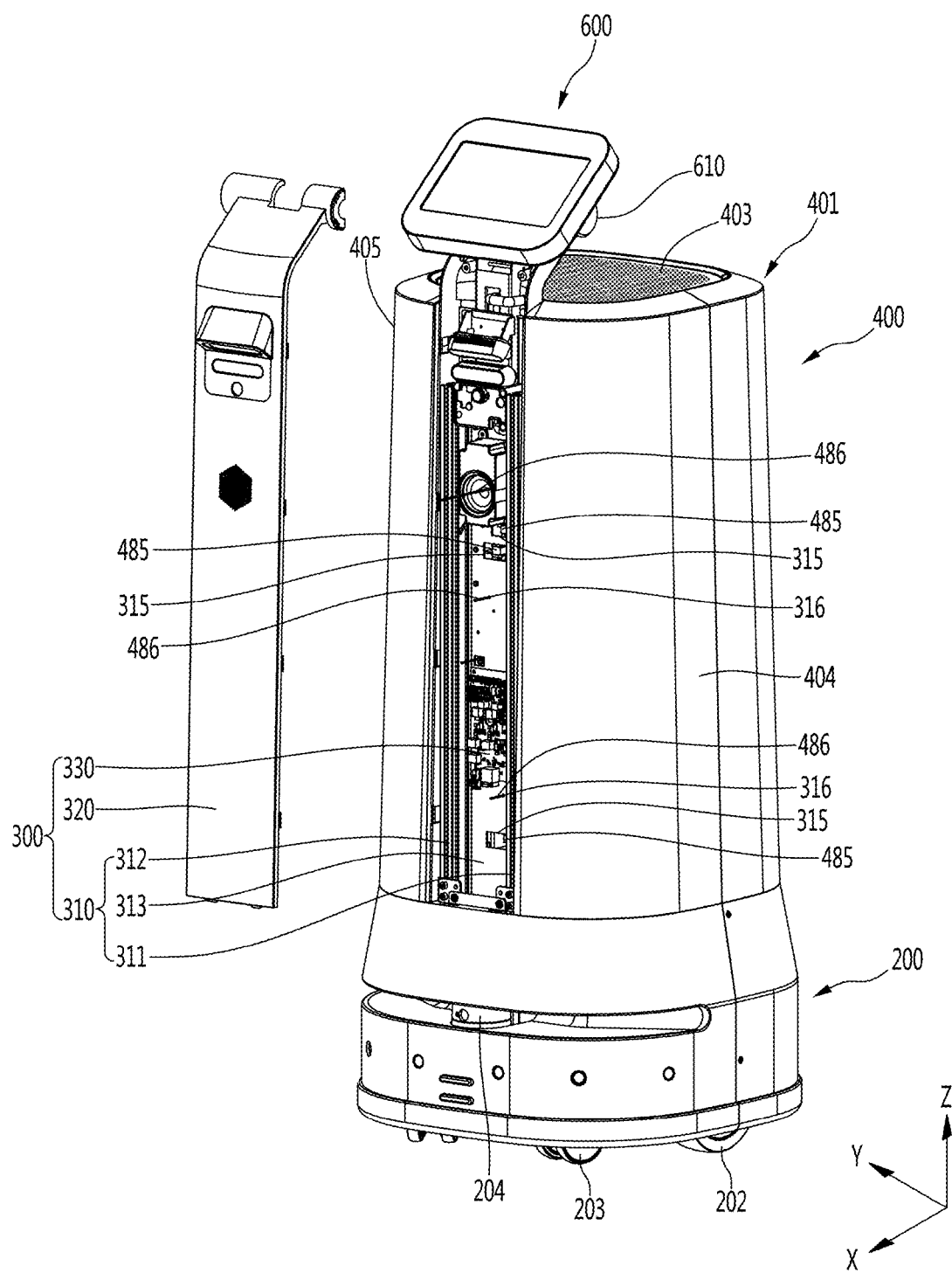
FIG. 22 is a perspective view of the robot when a front cover according to the present disclosure is detached forward.

FIG. 21 is an exploded perspective view of a robot according to the present disclosure, and FIG. 22 is a perspective view when a front cover according to the present disclosure is detached forward.

The frame 300 may further include a printed circuit board (PCB) 330 (see FIGS. 20 and 22) installed on the front neck 310.

As shown in FIG. 22, the front neck 310 may include a left plate 311 and a right plate 312 spaced part from each other in the left-and-right direction. The front neck 310 may include a rear plate 313 connecting the rear ends of the left plate 311 and the right plate 312. A space, in which the PCB 330 may be accommodated, may be formed in the front neck 310.

The PCB 330 may be disposed on the front surface of the front neck 310, or the PCB 330 may be disposed on the front surface of the rear plate 313 of the front neck 310, and may be accommodated in the front neck 310. When the front cover 320 is coupled, the PCB 330 may be hidden by the front cover 320.

The PCB 330 may be connected to each of the plurality of lockers 481, 482 and 483 through a cable to transmit control signals for controlling the plurality of lockers 481, 482 and 483 to the plurality of lockers 481, 482 and 483.

The PCB 330 may be disposed at the front side between the second locker 482 and the third locker 483 in consideration of the positions of the plurality of lockers 481, 482 and 483.

The plurality of drawers 450, 460 and 470 may be disposed to have a step difference in the front-and-rear direction X when being maximally inserted into the housing 401.

Meanwhile, a locking body 456 (see FIGS. 16 to 19) constrained by the lockers 481, 482 and 483 may protrude on the front end of each of the plurality of drawers 450, 460 and 470. The locking body 456 may have a ring shape, and an insertion hole 457, into which a locking pin 484 of each of the lockers 481, 482 and 483 is inserted, may be formed in the locking body 456 to be open in the upper-and-lower direction Z.

Through-holes 418 (see FIGS. 17 to 19), through which the locking body 456 may penetrate, may be formed in the housing 401 of the service module 400 and, more particularly, the inner housing 410.

When the drawers 450, 460 and 470 is maximally inserted into the inner housing 410, the locking body 456 may approach the upper or lower portion of the lockers 481, 482 and 483 through the through-holes 418.

The through-holes 418 formed in the inner housing 410 may respectively correspond to the drawers 450, 460 and 470, and, when the robot 100a includes three drawers 450, 460 and 470, three through-holes 418 may be formed in the inner housing 410.

The plurality of lockers 481, 482 and 483 may further include locking pins 484 (see FIGS. 17 to 19) for locking or unlocking the drawers 450, 460 and 470. The locking pins 484 may be respectively provided to the plurality of lockers 481, 482 and 483 and may be elevatably disposed on the plurality of lockers 481, 482 and 483.

Each of the plurality of lockers 481, 482 and 483 may include a solenoid and a plurality of power transmission members interworking with the solenoid to move the locking pin 484 up or down.

Each of the plurality of lockers 481, 482 and 483 may include a connecting terminal 485 (see FIGS. 17 to 20) connected with a cable connected to the PCB 330. The plurality of lockers 481, 482 and 483 may transmit a control signal received through the connecting terminal 485 to the solenoid to operate the solenoid.

A through-hole 315 (see FIGS. 20 and 22), through which the connecting terminal or the cable penetrates, may be formed in the front neck 310 to connect the cable to the connecting terminal 485.

The plurality of lockers 481, 482 and 483 may be connected with releasers 486 (see FIGS. 20 and 22) for forcibly moving the locking pins 484 to an unlocked position. The releasers 486 may be members installed to unlock the lockers 481, 482 and 483.

The releasers 486 may be disposed to extend from the inside of the lockers 481, 482 and 483 to the outside of the lockers 481, 482 and 483. One ends of the releasers 486 located outside the lockers 481, 482 and 483 may be free ends. The releasers 486 may be connected to at least one of the plurality of power transmission members installed in the lockers 481, 482 and 483.

When the releasers 486 are pulled forward, the plurality of power transmission members may pull the locking pins 484 such that the locking pins 484 move toward the inside of the lockers 481, 482 and 483.

In this case, the user or the administrator may pull and release the releasers 486 in order to forcibly release the locking state of the lockers 481, 482 and 483, and the lockers 481, 482 and 483 may be unlocked by the releasers 486.

Meanwhile, front openings, through which the releasers 486 for unlocking the lockers 481, 482 and 483 penetrate, may be formed in the front neck 310.

When the robot 100a includes three lockers 481, 482 and 483, three front openings 316 may be formed in the front neck 310. The three openings 316 may be disposed in the front neck 310 to be spaced apart from each other.

A portion of the releasers 486 may be accommodated in a space formed between the front neck 310 and the front cover 320, and the user or the administrator may pull and release the releasers 486 after detaching the front cover 320 forward, as shown in FIG. 22.

Meanwhile, when the front cover 320 covers the front side of the front neck 310, the front openings 316, the releasers 486 and the PCB 330 may be hidden and protected by the front cover 310.

The first locker 481, the second locker 482 and the third locker 483 may have the same structure, and the direction in which the (second) locker 482 is mounted may be different from the direction in which the other (first and third) lockers 481 and 483 are mounted. The (second) locker 482 may be mounted in the direction opposite to the other (first and third) lockers 481 and 483 in the upper-and-lower direction Z in consideration of the mounting position of the PCB 330.

The locking pin 484 of the first locker 481 and the locking pin 484 of the second locker 482 may protrude in opposite directions in the upper-and-lower direction Z.

As shown in FIG. 17, the locking pin 484 of the first locker 481 moves upward from the first locker 481 to be inserted into and locked to the locking body 456 formed in the first drawer, and the locking pin 484 of the first locker 481 may move downward to the inside of the first locker 481 to be released from the locking body 456 formed in the first drawer 450.

As shown in FIG. 18, the locking pin 484 of the second locker 482 may move downward from the second locker 482 to be inserted into and locked to the locking body 456 formed in the second drawer 460, and the locking pin 484 of the second locker 482 may move upward to the inside of the second locker 482 to be released from the locking body 456 formed in the second drawer 460.

The locking pin 484 of the second locker 482 and the locking pin 484 of the third locker 483 may protrude in opposite directions in the upper-and-lower direction Z.

As shown in FIG. 19, the locking pin 484 of the third locker 483 may move upward from the third locker 483 to be inserted into and locked to the locking body 456 formed in the third drawer 470, and the locking pin 484 of the third locker 483 may move downward to the inside of the third locker 483 to be released from the locking body 456 formed in the third drawer 470.

According to the embodiment of the present disclosure, since the service module gradually becomes thin upward, the center of gravity of the service module may be low, thereby minimizing the possibility of overturning the robot.

In addition, utilization of the space around the service module is high, the user may easily approach the display outside of the service module, and the display may be conveniently used.

In addition, since the plurality of drawers having the same shape and size may be mounted, it is possible to minimize the manufacturing cost.

In addition, since the plurality of drawer guides having the same shape and size may be mounted, it is possible to minimize the manufacturing cost.

In addition, since the drawer may be locked by the locker, it is possible to minimize the possibility of loss of items in the drawer.

In addition, since the locker may be unlocked through the releaser provided in the locker, it is possible to minimize inconvenience which may occur when the drawer is locked.

In addition, since the locker can be unlocked after opening the front cover, it is possible to easily unlock the drawer in an emergency.

In addition, since the drawer may cover the drawer guide, the appearance of the robot may be enhanced when the drawer is drawn out.

The above-disclosed subject matter is to be considered illustrative, and not restrictive, and the appended claims are intended to cover all such modifications, enhancements, and other implementations, which fall within the scope of the present disclosure.

Thus, the implementation of the present disclosure is to be considered illustrative, and not restrictive.

Therefore, the scope of the present disclosure is defined not by the detailed description of the disclosure but by the appended claims, and all differences within the scope will be construed as being included in the present disclosure.

What is claimed is:

1. A robot, comprising:
a mobile robot including a driving wheel;

a frame provided on the mobile robot;
a housing having a rear surface with a first opening;
a plurality of drawer guides, each drawer guide including:
   a fixed bracket fixed in the housing; and
   a moving bracket configured to move along the fixed bracket and be drawn out through the first opening; and
a plurality of drawers, each drawer mounted on a respective one of the moving brackets to be inserted into the housing or drawn out of the housing through the first opening,
wherein the plurality of drawers includes a first drawer and a second drawer, the second drawer being below the first drawer,
wherein the plurality of drawer guides includes a first drawer guide guiding the first drawer and a second drawer guide guiding the second drawer,
wherein the robot further comprises:
   a first locker configured to lock or unlock the first drawer; and
   a second locker configured to lock or unlock the second drawer,
wherein the frame includes a rear surface and at least one side surface,
wherein the housing further includes a front body surrounding the rear surface of the frame and the at least one side surface of the frame,
wherein the front body includes:
   a left plate and a right plate spaced apart from each other in a left-and-right direction; and
   a rear plate connecting the left plate of the front body with the right plate of the front body, and
wherein each of the first locker and the second locker is mounted on the rear plate.

2. The robot according to claim 1, wherein the first locker includes a locking pin for locking the first drawer, and
wherein the second locker includes a locking pin for locking the second drawer.

3. The robot according to claim 2, wherein the first locker further includes a releaser for unlocking the locking pin of the first drawer to unlock the first drawer, and
wherein the second locker further includes a releaser for unlocking the locking pin of the second drawer to unlock the second drawer.

4. The robot according to claim 1, further comprising:
a display; and
a display rotor provided in the frame, the display rotor being configured to rotate the display.

5. The robot according to claim 4, wherein the display rotor rotates the display in a plurality of modes, and
wherein the plurality of modes includes:
   a first mode in which a screen of the display faces a front upper side, and
   a second mode in which the screen of the display faces a rear upper side.

6. A robot, comprising:
a mobile robot including a driving wheel;
a frame provided on the mobile robot;
a housing having a rear surface with a first opening;
a plurality of drawer guides, each drawer guide including:
   a fixed bracket fixed in the housing; and
   a moving bracket configured to move along the fixed bracket and be drawn out through the first opening; and
a plurality of drawers, each drawer mounted on a respective one of the moving brackets to be inserted into the housing or drawn out of the housing through the first opening,
wherein the plurality of drawers includes a first drawer and a second drawer, the second drawer being below the first drawer,
wherein the plurality of drawer guides includes a first drawer guide guiding the first drawer and a second drawer guide guiding the second drawer,
wherein the robot further comprises:
   a first locker configured to lock or unlock the first drawer; and
   a second locker configured to lock or unlock the second drawer,
wherein the first locker includes a locking pin for locking the first drawer,
wherein the second locker includes a locking pin for locking the second drawer,
wherein the first locker further includes a releaser for unlocking the locking pin of the first drawer to unlock the first drawer,
wherein the second locker further includes a releaser for unlocking the locking pin of the second drawer to unlock the second drawer,
wherein the frame includes:
   a front neck having a front opening; and
   a front cover covering the front neck,
wherein the releaser of the first locker passes through the front opening of the front neck, and
wherein the releaser of the second locker passes through the front opening of the front neck.

7. The robot according to claim 6, wherein the locking pin of the first locker and the locking pin of the second locker protrude in opposite directions.

8. The robot according to claim 6, further comprising a printed circuit board (PCB) disposed on a front surface of the front neck and covered by the front cover.

9. The robot according to claim 8, wherein each of the plurality of lockers includes a connecting terminal connected to the PCB.

10. A robot, comprising:
a mobile robot including a driving wheel;
a frame provided on the mobile robot;
a housing having a rear surface with a first opening;
a plurality of drawer guides, each drawer guide including:
   a fixed bracket fixed in the housing; and
   a moving bracket configured to move along the fixed bracket and be drawn out through the first opening; and
a plurality of drawers, each drawer mounted on a respective one of the moving brackets to be inserted into the housing or drawn out of the housing through the first opening,
wherein the plurality of drawers includes a first drawer and a second drawer, the second drawer being below the first drawer,
wherein the plurality of drawer guides includes a first drawer guide guiding the first drawer and a second drawer guide guiding the second drawer,
wherein the robot further comprises:
   a display; and
   a display rotor provided in the frame, the display rotor being configured to rotate the display,
wherein the display rotor rotates the display in a plurality of modes,
wherein the plurality of modes includes:

a first mode in which a screen of the display faces a front upper side, and a second mode in which the screen of the display faces a rear upper side, wherein in the first mode, the display displays information indicating that the robot is traveling, and wherein in the second mode, the display displays at least one menu item selectable by a touch input.

11. The robot according to claim 10, wherein each of the plurality of drawers includes a pocket, wherein each pocket includes a left plate, a right plate and an upper plate, and wherein each pocket accommodates a respective drawer guide.

* * * * *